United States Patent
Madisetti et al.

(10) Patent No.: US 12,210,487 B2
(45) Date of Patent: Jan. 28, 2025

(54) METHOD AND SYSTEM FOR REAL-TIME COLLABORATION, TASK LINKING, AND CODE DESIGN AND MAINTENANCE IN SOFTWARE DEVELOPMENT

(71) Applicant: Vijay Madisetti, Johns Creek, GA (US)

(72) Inventors: Vijay Madisetti, Johns Creek, GA (US); Arshdeep Bahga, Chandigarh (IN)

(73) Assignee: Vijay Madisetti, Alpharetta, GA (US)

( * ) Notice: Subject to any disclaimer, the term of this patent is extended or adjusted under 35 U.S.C. 154(b) by 31 days.

(21) Appl. No.: 17/930,796

(22) Filed: Sep. 9, 2022

(65) Prior Publication Data

US 2023/0177015 A1 Jun. 8, 2023

Related U.S. Application Data

(63) Continuation-in-part of application No. 17/645,832, filed on Dec. 23, 2021, which is a continuation-in-part of application No. 16/948,255, filed on Sep. 10, 2020, now Pat. No. 11,226,938, which is a continuation of application No. 16/948,254, filed on Sep. 10, 2020, now Pat. No. 11,080,240.

(Continued)

(51) Int. Cl.
| | |
|---|---|
| G06F 16/176 | (2019.01) |
| G06F 16/18 | (2019.01) |
| G06F 16/182 | (2019.01) |
| G06F 40/169 | (2020.01) |
| G06F 40/289 | (2020.01) |

(52) U.S. Cl.
CPC ........ *G06F 16/176* (2019.01); *G06F 16/1815* (2019.01); *G06F 16/182* (2019.01); *G06F 40/169* (2020.01); *G06F 40/289* (2020.01)

(58) Field of Classification Search
None
See application file for complete search history.

(56) References Cited

U.S. PATENT DOCUMENTS

| | | | | |
|---|---|---|---|---|
| 2003/0110296 A1* | 6/2003 | Kirsch | ...................... | H04L 9/40 709/230 |
| 2003/0145312 A1* | 7/2003 | Bates | ...................... | G06F 8/30 717/106 |

(Continued)

OTHER PUBLICATIONS

Non-Final Office Action mailed on Jun. 17, 2024 in pending, related U.S. Appl. No. 17/645,832.

*Primary Examiner* — Thu N Nguyen
(74) *Attorney, Agent, or Firm* — Daniel C. Pierron; Widerman Malek, PL

(57) ABSTRACT

A real-time software development method including receiving a code file, generating a shadow code file including the code file content and a link to the code file, receiving an annotation to the shadow code file from a user, and saving the received annotation in the shadow code file as an annotation record, including annotation content, a time stamp, a creating user indication, a code line identifying at least one line of code comprised by the shadow code filed associated with the received annotation, and at least one of an action item and an assigned user. The annotation record does not change the content of the code file and can be viewed and edited by a plurality of users.

19 Claims, 34 Drawing Sheets

Related U.S. Application Data

(60) Provisional application No. 63/393,991, filed on Aug. 1, 2022, provisional application No. 62/899,172, filed on Sep. 12, 2019, provisional application No. 62/901,881, filed on Sep. 18, 2019, provisional application No. 62/969,693, filed on Feb. 4, 2020, provisional application No. 62/989,773, filed on Mar. 15, 2020, provisional application No. 62/993,733, filed on Mar. 24, 2020, provisional application No. 62/994,306, filed on Mar. 25, 2020, provisional application No. 63/023,292, filed on May 12, 2020.

(56) References Cited

U.S. PATENT DOCUMENTS

| | | |
|---|---|---|
| 2009/0265641 A1 | 10/2009 | Gibson et al. |
| 2011/0153362 A1 | 6/2011 | Valin et al. |
| 2013/0054636 A1* | 2/2013 | Tang .................... G06F 40/169 |
| | | 707/769 |
| 2014/0059051 A1* | 2/2014 | Graves, Jr. ............ G06F 16/176 |
| | | 707/740 |
| 2019/0114166 A1* | 4/2019 | Lakshmanan ............. G06F 8/71 |
| 2020/0356365 A1* | 11/2020 | Pezaris .................. G06F 40/14 |

* cited by examiner

FIG. 7

◎ CATCHUP    ⊕ DASHBOARD   ▦ WORKSPACE ⌄   ☷ TASKS ⌄   ⊙ ORGANIZATION ⌄   ▣ INVOICING ⌄   ⊙ ANALYTICS ⌄    ⊕   ≋ CLOUDARLING

▦ EVENTS ROSTER

DISPLAY [10 ⌄] RECORDS     [ + NEW ROSTER ]

| ID ⌄ | CLIENT ⌄ | MATTER ⌄ | PROJECT ⌄ | DATE ⌄ | WITNESS NAME ⌄ | TYPE ⌄ | ACTIONS ⌄ |
|---|---|---|---|---|---|---|---|
| 5 | ERICSSON | ERICSSON V. ACME3 PROPOSAL | COURT | 2020-05-30 | WILLIE BARNES | DEPOSITION | ▦ ⌄ |
| 6 | ERICSSON | ERICSSON V. ACME2 | COURT | 2020-06-10 | WILLIE BARNES | TRIAL | ▦ ⌄ |
| 25 | REPEAT PRECISION | RP VS DIAMONDBACK | CASE 6:19-CV-00034-ADA | 2019-06-08 | KIM BELLAH | DEPOSITION | ▦ ⌄ |
| 26 | REPEAT PRECISION | RP VS DIAMONDBACK | CASE 6:19-CV-00034-ADA | 2019-06-09 | | TRIAL | ▦ ⌄ |

SHOWING 1 TO 4 OF 4 ENTRIES     [ PREVIOUS ] [ 1 ] [ NEXT ]

Create Event Roster — 1100

Client: Repeat Precision
Matter: RP vs Diamondback
Project: Case 6:19-CV-00034-ADA
Event Type: Deposition
Date: 12/04/2019
Witness Name: Kim Bellah
Location: *Location*
Attorney Name: *Attorney Name*

☑ Video
☐ Signed
☐ Corrected
☐ Hard Copy
☑ Disk
☐ Added to Chron

Link to Transcript Rough: *Link to Transcript Rough*
Link to Transcript Final: *Link to Transcript Final*
Link to Video: *Link to Video*
Court Reporting Firm: *Court Reporting Firm*

[Submit] [Discard]

FIG. 11

Court Fields                                                      ✕

1200

| Case Number | Defendant |
|---|---|
| 6:19-CV-00034-ADA | Defendant |
| Judge | Respondent |
| Judge | Respondent |
| Clerk | Court |
| Clerk | Court |
| Title of Case | Date Field |
| Repeat Precision | Date Field |
| People | Linked Cases |
| People | Linked Cases |
| Plaintiff | Lawfirm Plaintiff |
| Plaintiff | Lawfirm Plaintiff |
| Petitioner | Lawfirm Defendant |
|  | Lawfirm Defendant |

Submit  Discard

FIG. 12

EXHIBIT ANALYTICS

CLIENT: REPEAT PRECISION  
MATTER: RP VS DIAMONDBACK  
PROJECT: CASE 6:19-CV-00034-ADA

SELECT EXPORT OR DOWNLOAD TYPE | → EXPORT EXHIBITS LIST | → DOWNLOAD EXHIBITS | ↑ LOAD

| DOCUMENT | TITLE | BATES NO | DOWNLOAD | DEPOSITION-KIM BELLAH-05/08/2019 | TRIAL-05/09/2019 |
|---|---|---|---|---|---|
| EXHIBIT_280_KIM.BELLAH.PDF | EXHIBIT 280 KIM BELLAH.PDF | DI-WDTEX 0034215 | ⬇ | ◉ | |
| EXHIBIT_279_KIM.BELLAH.PDF | EXHIBIT 279 KIM BELLAH.PDF | DI-WDTEX 0034218-DI-WDTEX 0034219 | ⬇ | ◉ | |
| EXHIBIT_282_KIM.BELLAH.PDF | EXHIBIT 282 KIM BELLAH.PDF | DI-WDTEX 0032874 | ⬇ | ◉ | |
| 94969373_0020_LIST_OF_COMPE.PDF | 0020_LIST OF COMPETITORS BY COMPANY PRODUCTS.PDF | GRIFFIN-0001528B | ⬇ | | ▣ |
| 0586_SS10__SS20_VOLUME_PRCI.PDF | 0586_SS10 & SS20 VOLUME PRICING.PDF | GRIFFIN-0001540-500-999 | ⬇ | | ▣ |
| 94969737_0255_DIAMONDBACK_IN.PDF | 0255_DIAMONDBACK INDUSTRIES, INC. INCOME BY CUSTOMER DETAIL, JANUARY THROUGH DECEMBER 2018.PDF | 09/04/2018 | ⬇ | | ▣ |
| 0587_SS10__SS20_VOLUME_PRCI.PDF | 0587_SS10 & SS20 VOLUME PRICING.PDF | GRIFFIN-0001546-500-999 | ⬇ | | ▣ |

◉ POTENTIAL DEPOSITION EXHIBIT   ◉ ACTUAL DEPOSITION EXHIBIT   ▣ POTENTIAL TRIAL EXHIBIT   ▣ ACTUAL TRIAL EXHIBIT  
◉ POTENTIAL MARKMAN HEARING EXHIBIT   ◉ ACTUAL MARKMAN HEARING EXHIBIT   ○ POTENTIAL MSJ HEARING EXHIBIT   ○ ACTUAL MSJ HEARING EXHIBIT

CATCHUP — DASHBOARD · WORKSPACE · TASKS · ORGANIZATION · INVOICING · ANALYTICS — CLOUDARRI INC

TASKS

VALIDITY_123
VALIDITY_478
INFRINGEMENT_123
INFRINGEMENT_478
DAMAGES_123_478
FEDERAL CIRCUIT
CLAIMCHARTS
COMPLAINT
PROJECT BUDGET
INBOUND DOCUMENTS
OUTBOUND DOCUMENTS
TRANSFER FROM VIRGINIA
INBOUND DOCUMENTS
OUTBOUND DOCUMENTS
INBOUND KIM BELLAH
INBOUND TRIAL

USERS
- RUSSELL RUGE (DA)
- AUSTIN ALLMON (DM)
- VELLA VINE (DM2)
- ROSITA RUSSAW (DM3)
- IAN CROSBY (IC)
- VIJAY MADISETTI (VM2)

SEARCH

AUSTIN ALLMON MAY 16, 9:39
[HOW-TECHNOLOGY-IS-SAFEGUARDING-HEALTH-AND-L.PDF]

AUSTIN ALLMON MAY 16, 9:39
[US7742927.PDF]

AUSTIN ALLMON MAY 16, 9:39
[US6771777.PDF]

AUSTIN ALLMON MAY 16, 9:39
[LOT.PDF]

B I U ⊖ ≡ ≡ A · ∠ · x₂ x² PARAGRAPH · Tx

SEND A NOTE OR MESSAGE (PRESS SHIFT+ENTER TO SEND)

1500

TASK TITLE
INBOUND DOCUMENTS
DESCRIPTION
INBOUND DOCUMENTS

START DATE                END DATE
2020-05-16            2020-06-30
CLIENT                    COURT
ERICSSON              PROJECT/MATTER
CLIENT REF ID             MATTER REF ID
ERIC1                 SEP34
PROJECT REF ID            TASK CODE
C123                  B110
CREATED BY                ASSIGNED TO

PRIORITY                  STATUS
LOW                   NOT STARTED
PROGRESS

TAGS
COURT

FOLLOWERS

MILESTONES                DEADLINE
MILESTONE

METHOD AND SYSTEM FOR REAL-TIME COLLABORATION, TASK LINKING, AND CODE DESIGN AND MAINTENANCE IN SOFTWARE DEVELOPMENT

RELATED APPLICATIONS

This application is a continuation-in-part application of and claims priority under 35 U.S.C. § 120 of U.S. patent application Ser. No. 17/645,832 filed on Dec. 23, 2021 and titled Method and System for Real-Time Collaboration and Event Linking to Documents and Video Recordings, which in turn is a continuation-in-part application of and claims priority under 35 U.S.C. § 120 of U.S. patent application Ser. No. 16/948,255, now U.S. Pat. No. 11,226,938, issued Jan. 18, 2022 filed on Sep. 10, 2020 and titled METHOD AND SYSTEM FOR REAL-TIME COLLABORATION AND EVENT LINKING TO DOCUMENTS, which in turn claims priority under 35 U.S.C. § 119 (e) of U.S. Provisional Patent Application Ser. No. 62/899,172 filed on Sep. 12, 2019 and titled Catchup-A Next Generation Management, Scheduling and Optimization for Organization, which in turn claims priority under 35 U.S.C. § 119 (e) of U.S. Provisional Patent Application Ser. No. 62/901,881 filed on Sep. 18, 2019 and titled Catchup-Resource-based Project and Task Management and Crowdsourcing, which in turn claims priority under 35 U.S.C. § 119 (e) of U.S. Provisional Patent Application Ser. No. 62/969,693 filed on Feb. 4, 2020 and titled Catchup-Task scheduling and resource management tool with integrated architecture, which in turn claims priority under 35 U.S.C. § 119 (e) of U.S. Provisional Patent Application Ser. No. 62/989,773 filed on Mar. 15, 2020 and titled CatchUp-Realtime Collaboration and Annotation-based Task Creation, which in turn claims priority under 35 U.S.C. § 119 (e) of U.S. Provisional Patent Application Ser. No. 62/993,733 filed on Mar. 24, 2020 and titled CatchUp-Real-Time Collaboration and Annotation-Based Task Creation, which in turn claims priority under 35 U.S.C. § 119 (e) of U.S. Provisional Patent Application Ser. No. 62/994,306 filed on Mar. 25, 2020 and titled CatchUp-Real-Time Collaboration and Annotation-Based Task Creation and Management, which in turn claims priority under 35 U.S.C. § 119 (e) of U.S. Provisional Patent Application Ser. No. 63/023,292 filed on May 12, 2020 and titled CatchUp-Real-Time Task Collaboration and Event Linking to Documents, which in turn is a continuation application of and claims priority under 35 U.S.C. § 120 of U.S. patent application Ser. No. 16/948,254, now U.S. Pat. No. 11,080,240, issued Aug. 3, 2021 filed on Sep. 10, 2020 and titled METHOD AND SYSTEM FOR REAL-TIME COLLABORATION AND ANNOTATION-BASED ACTION CREATION AND MANAGEMENT. This application also claims priority under 35 U.S.C. § 119 (e) of U.S. Provisional Patent Application Ser. No. 63/393,991 filed on Aug. 1, 2022 and titled Collaboration on Code Design, Development and Maintenance using GlassViewer. The contents of these applications are incorporated herein by reference.

FIELD OF THE INVENTION

The present invention relates to real-time collaboration and annotation-based task creation and management.

BACKGROUND

Collaboration is vital in the world of business as it harnesses the best out of two or more individuals together. A typical medium or large enterprise (such as a lawfirm), may have a large number of clients and multiple projects ongoing with each client. The projects can often be opaque and confusing as there are no fixed set of tasks within a project. Tasks can have creeping requirements and the workers don't know how to track or record progress, while managers can't measure according to any agreed to measure of progress.

Teams of workers often find it challenging to do work effectively because they do not know how other employees are progressing. Resources for tasks are typically not specified in advance leading to all sorts of bottlenecks and failures and unrealistic deadlines and cost figures. Users have no defense against bad reviews as they cannot show the log or proof that they did all tasks as required or they did not report their true work or progress in time. Managers cannot complain that they don't have visibility nor can they be blamed for workers who do not work. There is no history of previous tasks to learn upon, nor is there a way a new employee can quickly substitute for another existing employee who leaves or is removed from a task, or if new resources are suddenly available. Teams of workers themselves cannot do work effectively because they do not know how other employees are progressing and they can get blamed if the other worker fails. Organizational policies, affinity rules and regulatory and business guidelines depend on people and cannot be automatically enforced.

Existing point-to-point communication solutions (such as Email, SMS, WhatsApp or other Messaging apps) allow a lot of rich content to be exchanged, but it is without context. Typically labels/conversations/groups attempt to remedy this issue, by providing pseudo context based on temporal topics. Existing solutions for point-to-point communications with some context (such as Slack and Microsoft Teams) provide context to the communications, while allowing rich content. However, these tools do not provide a mapping to business processes or short-term business tasks with deadlines and deliverables where there is focused interaction to complete a task. These tools do not allow resource allocation and nor do they add real-time capabilities beyond notifications. They add on auxiliary services like voice and video conferencing to support voice and video meetings, but there is no memory of what happened in those interactions, nor is their customization in any way.

Managing evidence strategically for trials and cases is a challenging task for lawfirms. The discovery phase is where lawfirms gather evidence or information that is used to create evidence that may be potentially used in court proceedings. This results in a lot of documents that must be managed and used in different court-related procedures and events, such as pre-trial hearings, motions for summary judgement, depositions, and markman hearings. Not all produced documents will be final exhibits, and the process of converting documents to final admitted exhibits is long and burdensome, in a manner to support legal strategy, and requires significant efforts on the part of attorneys, clerks, legal assistants and IT staff at lawfirms.

Currently teams of legal staff and attorneys work together over periods of days and weeks to organize exhibits to identify exhibits that are/were intended for use, actually used, or admitted into court, and preparing folders and listings. In addition, from legal strategy point of view certain exhibits may be more suitable than others for the purposes of trial and other court procedures, and all this analysis, culling and mixing is done manually over a period of weeks and months leading up to the trial, when frankly speaking, that is the time when one is the busiest and better off doing other work like preparing witnesses and briefs. These challenges are further compounded by the distributed and remote nature of legal work.

Programmers want to document the rationale, choices made, opinions expressed on the design, test features, other notes, code functionality, features, and references to other files or code, or functionality. Current approaches to comments, are focused on a few lines that explain what a line of code is doing or a function is intended to do in the final version of the code. Detailed comments are valuable in upgrading the code, or understanding why certain ways of implementation were chosen and other insight into the requirements development, specification, early design, trade-offs and relation to other code.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to a system and associated methods for real-time collaboration and annotation-based task creation and management.

In some embodiments, the method and systems may further comprise a task management, scheduling, execution and resource optimization environment for organizations (referred as CatchUp) that provides the following features:

Task Management: CatchUp focuses on short term tasks that require coordination. Tasks can be filtered by user (creator, assignee or follower), client, project, matter and tags.

Business Specific Task Structure: Each organization can have multiple clients. Each client can have multiple Business Specific Task Structures including matters, projects, tasks and users.

Calendar View: CatchUp provides a Calendar view for action items, tasks and meetings.

Real-time Communication: Tasks have a set of notes organized as a running timeline that is like a chat. Attachments can be added to the task notes. Users can provide immediate feedback, ask questions, request updates for tasks and add fee or expense items to tasks. CatchUp uses WebSockets and Server Sent Events (SSE) technologies to enable real-time presence, messaging and collaboration. Users can chat and collaborate in real-time though task notes or direct messages. User mentioning and hashtags are supported with task notes and messages which allows creating action items inline.

Document Management: Catchup features an enterprise grade document management system to create, share and collaborate on documents in real-time.

Document Annotation: CatchUp GlassViewer allows viewing and annotating PDF documents including comments, text highlighting, and other tools. The annotations are transmitted to the CatchUp server, which then creates action items that are then posted to a work queue. The action items then direct back to the comments/annotation when opened. While previous approaches only allow comments that do not affect the original document, the new approach in CatchUp allows executable commands to be included inside the comments and annotations. CatchUp supports annotations and comments for PDF and Office format documents.

Kanban & Action Items: CatchUp provides a Kanban view for action items. Action items can be created in multiple ways: (1) Directly from the Kanban page, (2) Mentioning users in Task Notes or Messages, (3) Mentioning users in document annotations.

Blockchain Certification: Users can certify and timestamp documents and notes on a blockchain network.

Cryptocurrency Wallet: Tasks and action items can be assigned a budget in terms of a cryptocurrency.

Wiki: Users can share knowledge and unleash collective intelligence for their business through wiki and bulletin boards.

Video Conferencing: Enterprise-grade video conferencing and online meetings capability is available within CatchUp.

Alerts: Users can set a filter to monitor when a task is running late on some deadline.

Advanced Analytics: The advanced analytics features in Catchup allow users to get a big picture on tasks and projects.

Notifications: Users can opt to receive a Daily Digest email with details on all tasks which the user has created, tasks being followed by the user and tasks assigned to the user.

Invoicing and Time/Expense Management: Users can create and export invoices in formats such as PDF, CSV, LEDES formats.

Provides Context & Content: CatchUp provides context and content as mapped to business and formal relationships driven by relationships. It allows real-time interaction, collaboration facilitation, and memorializes and facilitates all work product in a manner that it can be deliver to the client, customer or end consumer, and also allows linkage to resources for cost and resource efficiency, and allows efficient execution of business processes in a distributed context.

Secure & Customizable with On-Premises or Cloud Options: CatchUp is a highly secure and customizable platform with option of on-premises or cloud based deployment, and user interfaces optimized for all types of devices.

Within CatchUp you can ingest documents and add meta-data such as notes, tags, comments and annotations to the documents using patented and patent-pending technologies. CatchUp organizes documents into different smart stacks based on an automated analysis of meta-data added to the documents, driven by lawfirm priorities and strategy. With the documents neatly organized, CatchUp allows you to export lists of potential and actual exhibits for deposition, trial and other events, along with the zip archives of the exhibits. CatchUp also presents detailed analytics on the use of documents in different activities of the legal firm. While the old way of managing exhibits involved manual labor, a lot of time, cost, and strategy is lost due to the information overload. The new way of managing exhibits with CatchUp, showcases organizational strategies and policies combined with analytics producing best result in terms of legal strategy and execution.

Further embodiments of the inventions are directed to a method for facilitating real-time collaboration of document mark-up and events correlation utilizing a server comprising an inbound document folder, a cloud document database comprising a plurality of managed documents, an event database comprising a plurality of events, and an event spreadsheet, the method comprising receiving an inbound document from a user device, receiving an indication of an associated event of the plurality of events with which the inbound document is associated, storing the inbound document in the cloud document database, defining a stored inbound document, extracting information from the stored inbound document, defining extracted information, adding metadata to the stored inbound document associating the inbound document with the associated event responsive to the indication of the associated event and the extracted information, modifying the event spreadsheet responsive to the indication of the associated event, receiving a request to access the stored inbound document from a user device, and transmitting the stored inbound document to a browser application running on the user device.

In some embodiments the metadata may comprise an indication whether the stored inbound document is of potential use for the associated event. In some embodiments the metadata may comprise an indication whether the stored inbound document was used for the associated event. In some embodiments the metadata may comprise an indication whether the stored inbound document was admitted for the associated event.

In some embodiments the method may further comprise receiving an indication of a plurality of events with which the stored inbound document is associated, defining a plurality of associated events, where the metadata comprises an indication whether the stored inbound document is of potential use for each event of the plurality of associated events. In further embodiments, the metadata may comprise an indication that the stored inbound document was one of used and not used for an event of the plurality of associated events. In some embodiments, the metadata may comprise an indication that the stored inbound document was one of admitted and not admitted for an event of the plurality of associated events.

In some embodiments, the extracted information may comprise at least one of a document description, a document date, a document number, a bates number, and a security classification.

In some embodiments, the method May 1 further comprise receiving an annotation to the stored inbound document from the browser application within which the stored inbound document was opened, extracting metadata from the annotation, defining extracted annotation metadata, and adding the extracted annotation metadata to the stored inbound document. The annotation does not change the file content of the stored inbound document.

In some embodiments, the server may comprise a document metadata database comprising a plurality of document metadata records. Each managed document of the plurality of managed documents may be linked to a document metadata record of the plurality of document metadata records. In further embodiments, the method may further comprise linking the document metadata record to a user record stored on a user record database comprised by the server and at least one of a case record, an event roster, and an exhibit record.

In some embodiments, the server may be a cloud server. In some embodiments, the method may further comprise receiving an indication the user has opened the managed document and receiving an indication an annotation was added to the managed document. The indications are received at the server via REST over HTTP.

Further embodiments of the invention may be directed to a server for facilitating real-time collaboration of document mark-up and event correlation comprising a storage medium having stored thereon, an inbound document folder, a cloud document database comprising a plurality of managed documents, an event database comprising a plurality of event records, and an event spreadsheet. The server may further comprise a network communication device configured to receive an inbound document from a user device and receive an indication of an associated event of the plurality of events with which the inbound document is associated, receive a request to access a managed document, and transmit the requested document to the user device to be opened within a browser application. The server may further comprise a processor operatively coupled to each of the network communication device and the storage medium, the processor configured to store the inbound document in the cloud document database, defining a stored inbound document, extract information from the stored inbound document, defining extracted information, add metadata to the stored inbound document associating the inbound document with the associated event responsive to the indication of the associated event and the extracted information, and modify the event spreadsheet responsive to the indication of the associated event.

In some embodiments, the metadata may comprise an indication whether the stored inbound document is one of potential use for the associated event, was used or not used for the associated event, and was admitted for the associated event.

In some embodiments, the network communication device may further be configured to may further comprise receiving an indication of a plurality of events with which the stored inbound document is associated, defining a plurality of associated events. The metadata may comprise an indication whether the stored inbound document is of potential use for each event of the plurality of associated events. The metadata may further comprise an indication that the stored inbound document was one of used and not used for an event of the plurality of associated events. In further embodiments the metadata may comprise an indication that the stored inbound document was one of admitted and not admitted for an event of the plurality of associated events.

In some embodiments, the extracted information may comprise at least one of a document description, a document date, a document number, a bates number, and a security classification. In some embodiments, the network communication device may further be configured to receive an annotation to the requested document from the browser application within which the requested document was opened and the processor may further be configured to extract metadata from the annotation. The annotation does not change the file content of the stored inbound document. The server may further comprise a document metadata database comprising a plurality of document metadata records. Each managed document of the plurality of managed documents may be linked to a document metadata record of the plurality of document metadata records.

In some embodiments, the network communication device may further be configured to receive an indication the user has opened the managed document and receive an indication an annotation was added to the managed document. The indications are received at the server via REST over HTTP.

BRIEF DESCRIPTION OF THE DRAWINGS

FIG. 7 is an exemplary illustration of the process of extracting meta-data from documents, according to an embodiment of the invention.

FIG. 10 is an exemplary interface of the CatchUp platform showing events roster, according to an embodiment of the invention.

FIG. 11 is an exemplary interface of the CatchUp platform showing event creation dialog, according to an embodiment of the invention.

FIG. 12 is an exemplary interface of the CatchUp platform showing court case creation dialog, according to an embodiment of the invention.

FIG. 14 is an exemplary interface of the CatchUp platform showing exhibit analytics, according to an embodiment of the invention.

FIG. 15 is an exemplary interface of the CatchUp platform showing task notes and real-time communication, according to an embodiment of the invention.

FIG. 16 is an exemplary interface of the CatchUp platform showing kanban view of action items, according to an embodiment of the invention.

FIG. 30 is an illustration of the CatchUp GlassViewer for Code Collaboration, according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
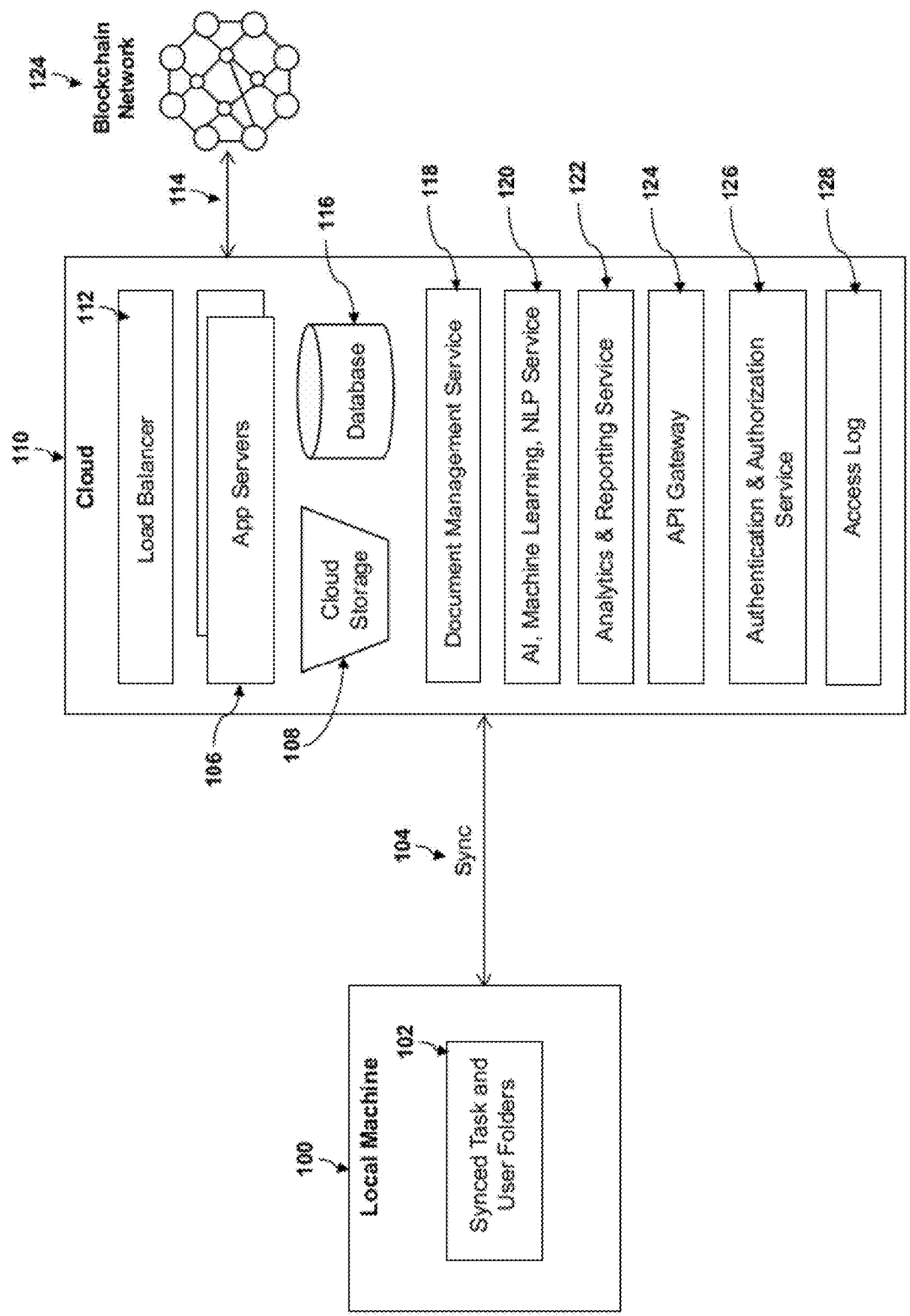
FIG. 1 is a schematic block diagram of a cloud-based host environment and a local synced folder according to an embodiment of the present invention.

Referring now to FIG. 1 a schematic block diagram of a cloud-based host environment and a local synced folder is described in more detail. The cloud-based host environment 110 configured in data communication with a local machine 100 (e.g., computer, or a smartphone) that may host a synchronized user and task folders 102. The cloud-based host environment 110 may control the creation, lifecycle and destruction of digital objects (for example, and without limitation, data artifacts such as documents, software, video, images and music). Such digital objects may be synchronized from the host environment 110 to the user and task folders 102 hosted on the local machines 100, and also may be secured such that the digital objects may not be viewed, deleted, stored, edited, or copied without permission, knowledge and control of the host environment 110. The digital objects may be stored and replicated in the cloud-based host environment 110 comprising application servers 106 placed under a load balancer 112. The cloud-based host environment 110 may include a cloud storage 108 configured for storage of digital objects. A document management service 118 may control the digital objects' lifecycles. A database 116 within the cloud environment 110 may maintain information about the digital objects, user IDs of the object owners, object creation timestamps, change logs recording changes in object state, transactions executed or attempted, and object permissions. An Artificial Intelligence (AI), Machine Learning and Natural Language Processing (NLP) service 120 enables automated extraction of meta-data from digital objects (such as creation dates, document identifiers, document number, description and security specification). The analytics and reporting service 122 may employ big data tools and frameworks for batch or real-time analytics (as described in more detail below) on available databases and meta-databases, for instance, to analyze documents, digital object access logs and network traffic. The cloud environment 110 may further include application programming interface (API) gateway 124 that exposes APIs for creating, updating, and deleting digital objects, and for operating authentication and authorization and analytics and reporting functions. These APIs may be used for developing document management and analytics applications that operate within an organization's network. For implementing the components within the cloud-based host environment 110, micro-services architectures may be used whereby each service may perform a predefined set of actions and may communicate with other services through the use of inter-service communication mechanisms such as request-response (e.g. REST over HTTP), publish-subscribe (e.g. MQTT), remote procedure call (RPC) (e.g. Thrift), or notifications. In certain embodiments of the present invention, these services may be developed, deployed and scaled independently. A blockchain network 124 is used for certifying and timestamping documents/objects stored with the cloud environment 110 that establishes the proof of existence, ownership, custody and integrity of such documents/objects.

In certain embodiments of the present invention, security features for advantageously providing secure access to the cloud-based host environment 110 may include one or more of the following:

1) Authorization Services: As a matter of definition, authorization refers to digitally specifying access rights to protected resources using access policies. The cloud-based host environment 110 may include authorization services such as policy management, role management and role-based access control. A role-based access control framework may be used to provide access to digital objects in the cloud environment 110 to users based on the assigned roles and data access policies. The cloud environment may support "OAuth," an open standard for authorization that allows resource owners to share their private resources stored on one site with another site without handing out the credentials.

2) Identity Management Services: Identity management services may provide consistent methods for identifying persons and maintaining associated identity attributes for users across multiple organizations. For example, and without limitation, Federated Identity Management (FidM) may be enforced for the host 100. FidM provides the ability to establish trust relationships between various security domains to enable the passing of authentication, authorization and privacy assertions.

3) Authentication Services: The cloud environment 110 may support authentication services 126 configured to prevent digital objects from being accessed by unauthorized users. For example, and without limitation, authentication and authorization services 126 may include a Single Sign On (SSO) that may enable users to access multiple applications after signing in for a first time. In addition to SSO, One Time Password (OTP) security may also be enforced. OTPs may be delivered via SMS and email. One benefit of OTP is that such security regimes are not vulnerable to replay attacks.

4) Data Encryption: The cloud environment 110 may adopt a data encryption standard such as the Advanced Encryption Standard (AES) for encrypting all data that is stored in the host. In addition to encryption of stored data, all transmission of data may be protected with Secure Socket Layer (SSL) encryption technology.

Figure 2:
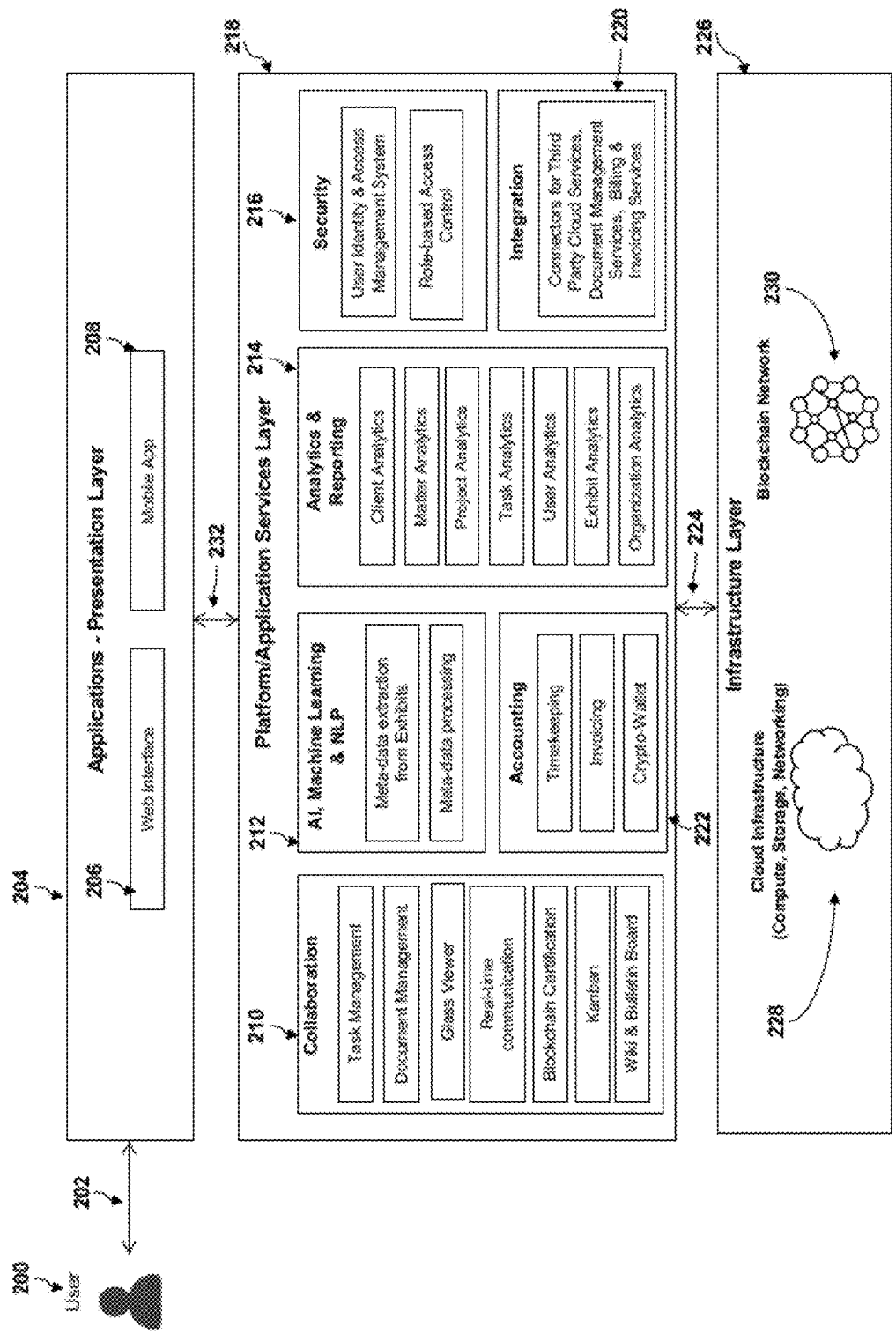
FIG. 2 is a schematic diagram of the CatchUp real-time collaboration and annotation-based task creation and management platform, according to an embodiment of the invention.

Referring now to FIG. 2 is a schematic diagram of the CatchUp real-time collaboration and annotation-based task creation platform, is described in more detail. A user 200 may interact with the platform through use of an application and presentation layer 204. The application and presentation layer 204 may comprise a web interface 206 and/or a mobile application 208. Elements of the application and presentation layer 204 may be the client-facing element of a platform/application services layer 218. The platform/application services layer 218 may comprise security features 216, such as a user identity and access management system and role-based access control. The platform/application services layer 218 may further comprise integration services 220, such as, for example, Connectors for Third Party Cloud Services, Document Management Services, Billing & Invoicing Services. The platform/application services layer 218 may further comprise collaboration features 210. The collaboration features 210 may include task management, document management, Glass Viewer, real-time communication, blockchain certification, kanban, wiki and bulletin board. The platform/application services layer 218 may further comprise accounting services 222, such as timekeeping, invoicing and cryptocurrency wallet. The platform/application services layer 218 may further comprise analytics and reporting services 214, for client analytics, matter analytics, project analytics, task analytics, user analytics, exhibit analytics and organization analytics. The platform/application services layer 218 may function on an infrastructure layer 226 that may comprise one or more of cloud infrastructure 228 (such as cloud computational resources, cloud storage resources, or cloud networking resources.) and blockchain network 230.

Figure 3:
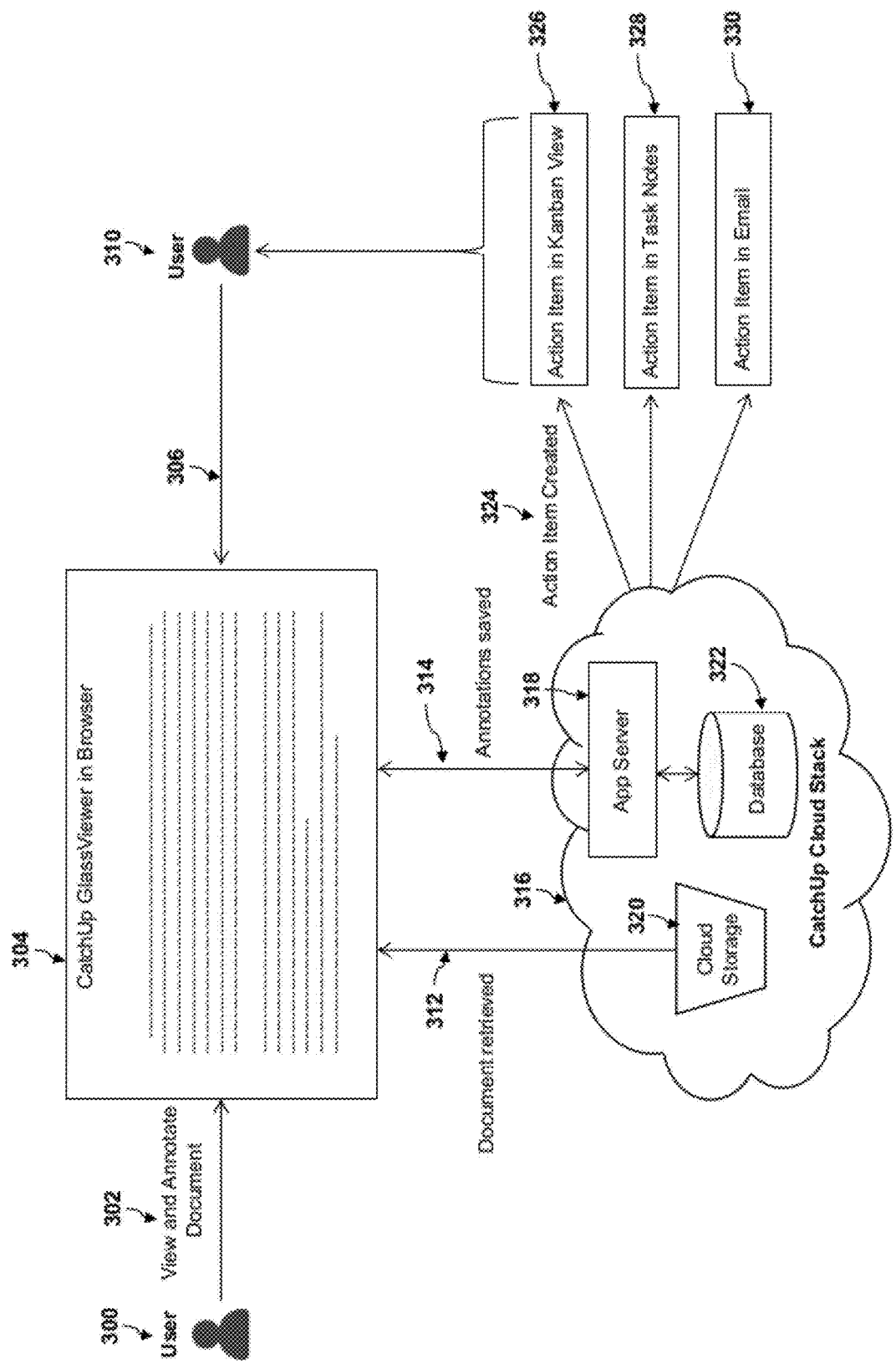
FIG. 3 is an illustration of the round-trip process of creating action items from annotations, according to an embodiment of the invention.

Referring now to FIG. 3 is an illustration of the round-trip process of creating action items from annotations, is described in more detail. CatchUp features an enterprise grade document management system to create, share and collaborate on documents in real-time. A user 300 may view and annotate 302 a document stored with the Cloud Storage 320 that is a part of the CatchUp Cloud Stack 316 using the CatchUp GlassViewer 304. The CatchUp GlassViewer 304 allows viewing and annotating documents including comments, text highlighting, and other tools. The annotations are transmitted 314 to the application server 318, which then creates 324 action items that are then posted to a kanban view 326, task notes 328 and via email 330. The action items then direct the user 310 (to whom the action items have been assigned) back to the comments/annotation when the document is opened with the CatchUp GlassViewer 304. While previous approaches only allow comments that do not affect the original document, the new approach in CatchUp allows executable commands to be included inside the comments and annotations. CatchUp supports annotations and comments for PDF and Office format documents.

Additionally, it is contemplated and included within the scope of the invention that the user 300 may transmit a document to the CatchUp Cloud Stack 316 to be stored in the Cloud Storage 320 and subsequently viewed and annotated. When the document is transmitted to the CatchUp Cloud Stack 316 the user 300 may also provide an indication of an associated event with which the document is associated.

CatchUp supports both "user added" action items and "system added" action items. A user added action item is one that is added by a user and assigned to another user. A system added action item is one that is automatically added by the system when there is a resource allocation needed. There can be two types of users: human and non-human (machines, cars, MQTT brokers, for instance). Non-human users function like "virtual users" within the system. For example, a virtual user can be a CAT Scan machine which is assigned an action item to do a particular CAT scan task on a patient, and it updates it status of action item within the Kanban view and performs the task. Additionally, a cryptocurrency wallet may be charged for the cost of running the machine and an expense item is added and a budget is deducted.

Figure 4:
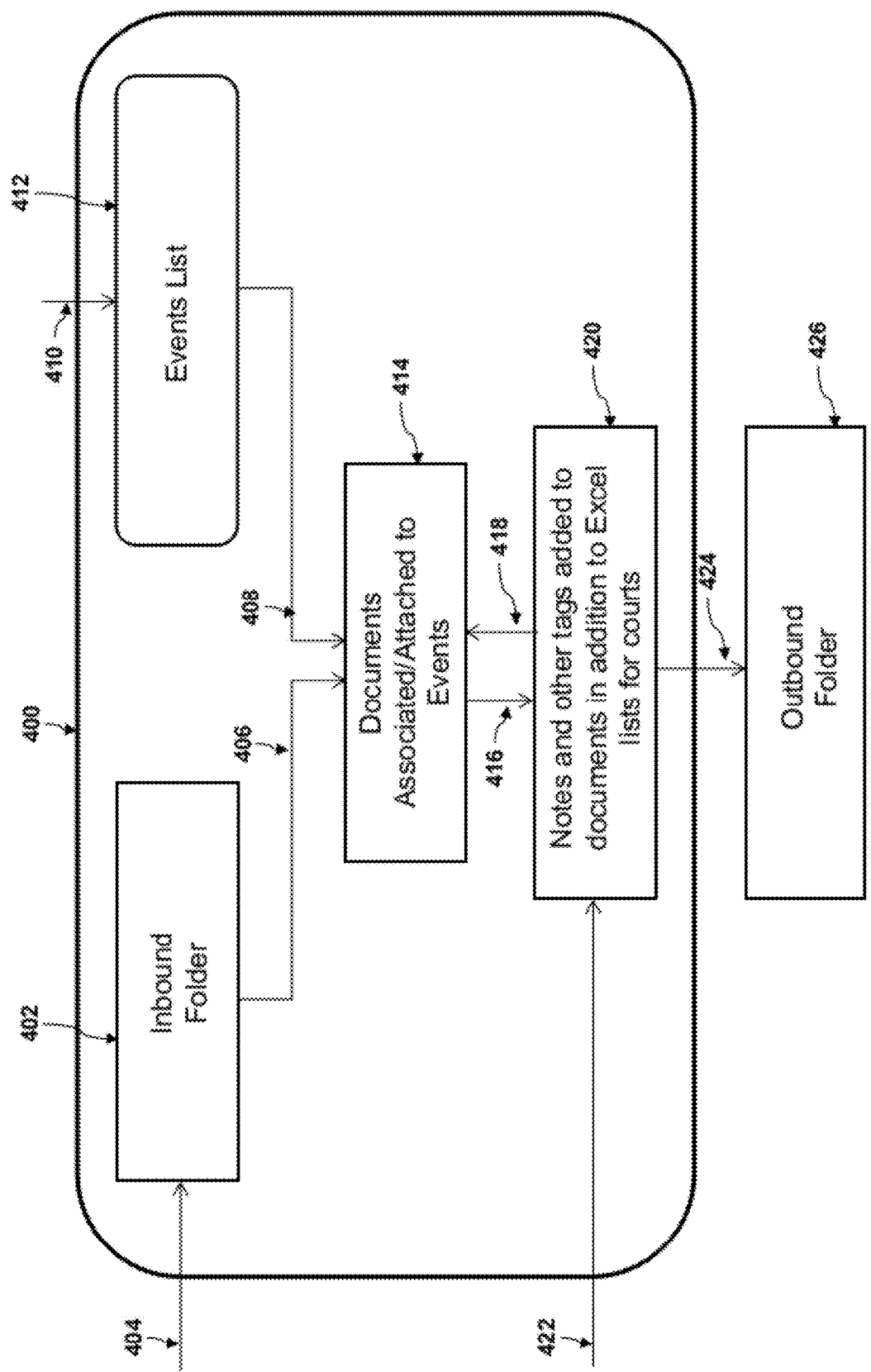
FIG. 4 is an illustration of the document to event linking process, according to an embodiment of the invention.

Referring now to FIG. 4 an illustration of the document to event linking process, is described in more detail. Documents for court and trail and other litigation use are ingested 404 into an inbound folder 402 comprised by a CatchUp Server 400 related to client/matter/project/task. Documents 406 are linked 414 to events 408 in an event list 412. Both potential and actual exhibit fields are recorded. Notes and reviews of documents by attorneys and others are recorded 420 as part of comments panels that are stored independent of the source documents, for example, through glass viewer features. The round-trip annotation to task action item features 416, 418 are also preserved. Sync of files and folders to local computer is also supported with the "court case" folder synced to local and cloud storage options. Detailed analytics and search features are included to generate Excel and other formatted reports for court use and internal organizational use. The output Excels lists for courts are copied 424 to an outbound folder 426.

Figure 5:
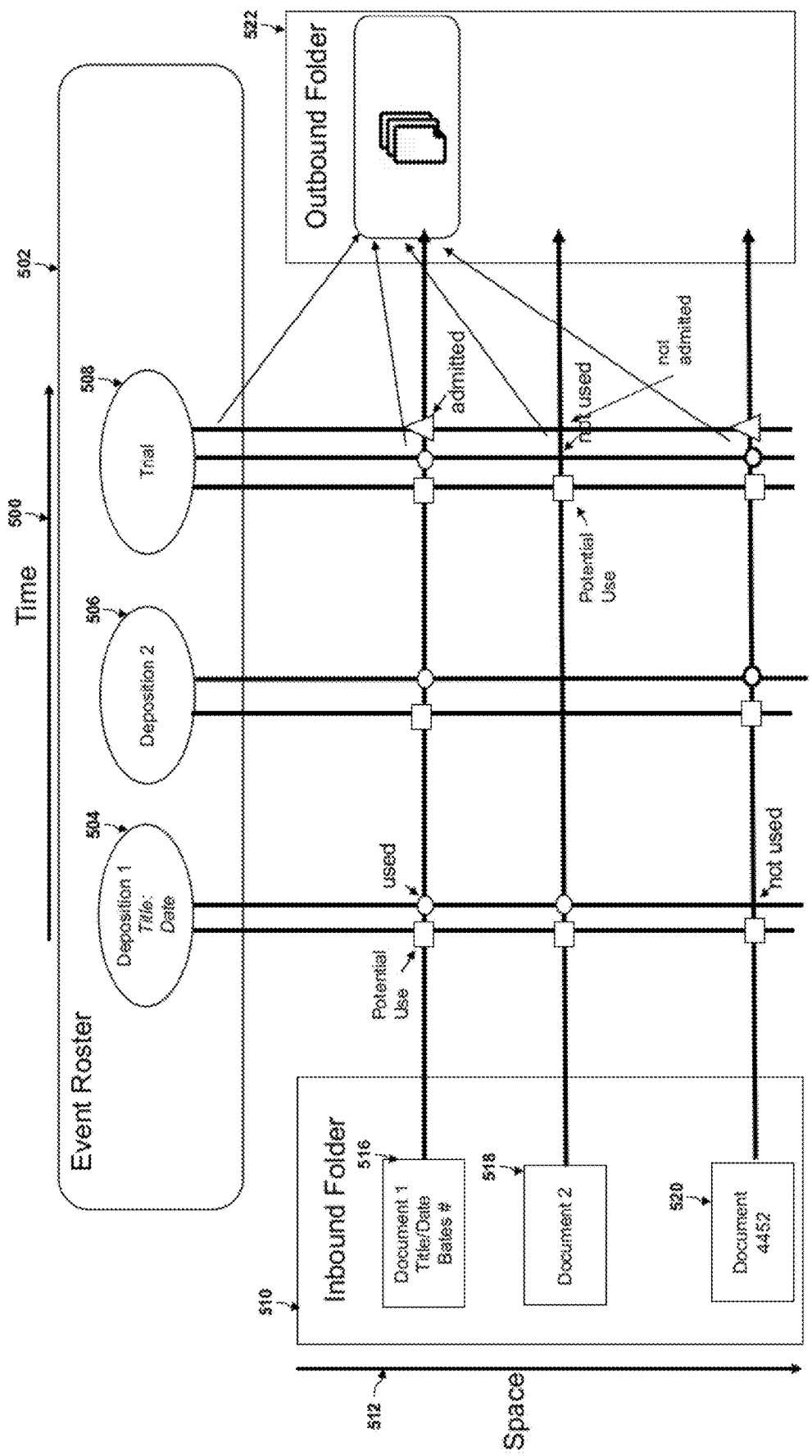
FIG. 5 is an illustration of the time-space event flow with linking of documents to events, according to an embodiment of the invention.

Referring now to FIG. 5 an illustration of the time-space event flow with linking of documents to events, is described in more detail. The time dimension 500 comprises a list of events (e.g. 504, 506, 508) within event roster 502. The events can be of types Deposition, Trial, Markman hearing, MSJ hearing, for instance. Events can have attributes such as witness name, date, attorney name, for instance. The space dimension 512 comprises a list of exhibits in an inbound folder 510. Each exhibit 516, 518, 520 has meta-data such as bates number range, title, description and date, for instance. The exhibits are linked to events in a time-space event flow, where the linking type can be either potential use, actual use or admitted. An outbound folder 522 contains a spreadsheet, for example an Excel spreadsheet of exhibits based on the time-space linking such as Potential Deposition Exhibits list, Actual Deposition Exhibits list, Potential Trial Exhibits list and Actual Trial Exhibits, list, for instance.

Figure 6:
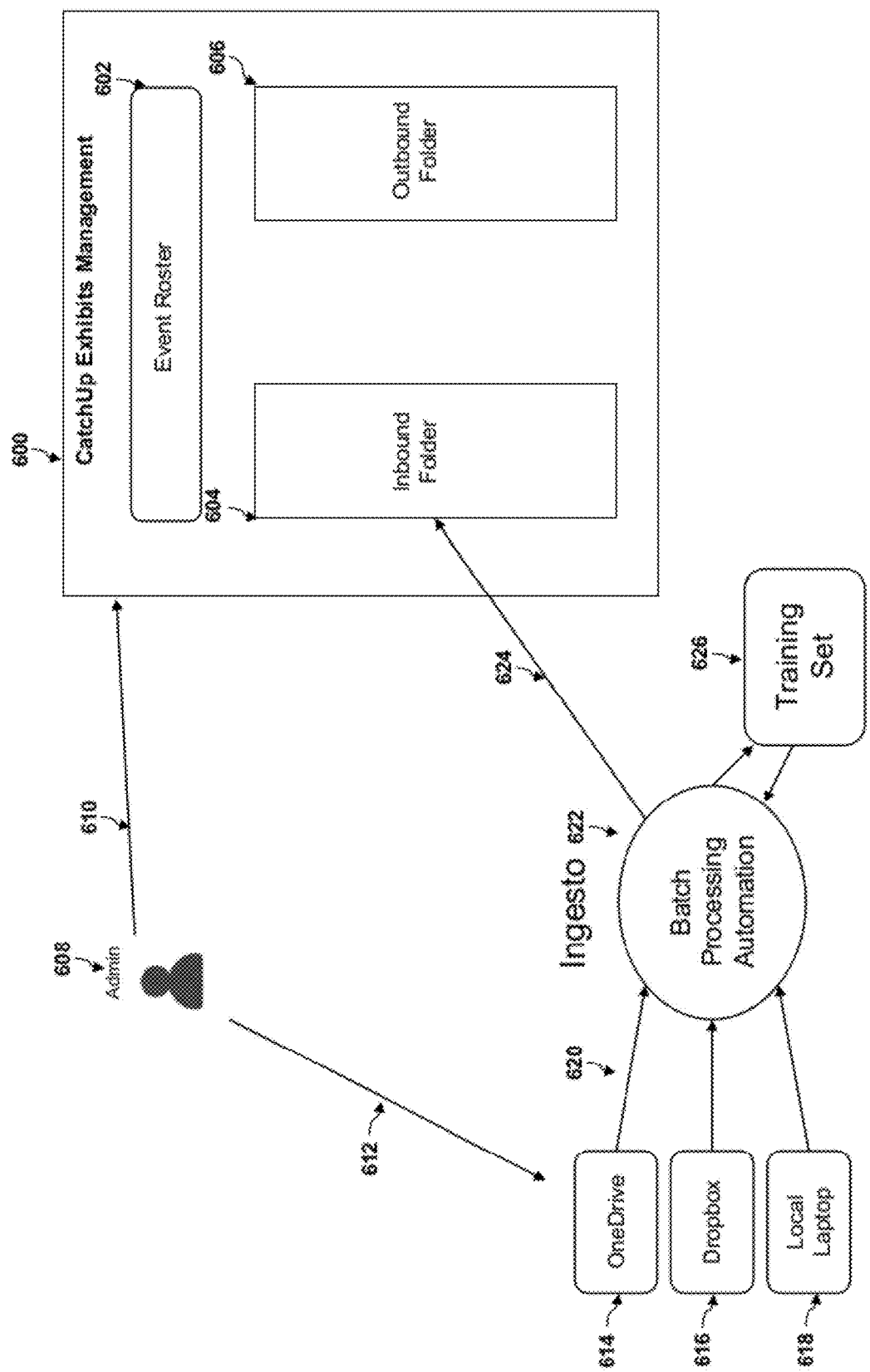
FIG. 6 is an illustration of the document ingesting process, according to an embodiment of the invention.

Referring now to FIG. 6 an illustration of the document ingesting process, is described in more detail. Documents or exhibits may be ingested from different sources such as local laptop/desktop machine or user 618, or Cloud Storage services such as Dropbox 616 or OneDrive 614, for instance. The documents are processed 620 in batch at step 622 to extract meta-data such as bates number range, title, description and date, for instance. The batch processing automation step 622 uses a training set 626 for training the AI or Machine Learning models for extraction of meta-data. The documents and extracted meta-data are stored 624 within an inbound folder 604 comprised by the CatchUp Exhibit Management system. The documents/exhibits may be linked to events within an event roster 602. An outbound folder 606 contains an Excel list of exhibits based on the time-space linking such as Potential Deposition Exhibits list, Actual Deposition Exhibits list, Potential Trial Exhibits list and Actual Trial Exhibits, list, for instance. An administrator 608 may control each of the CatchUp Exhibits Management system and the document/exhibit sources 614, 616, 618 to facilitate and manage document ingestion.

Figure 7:
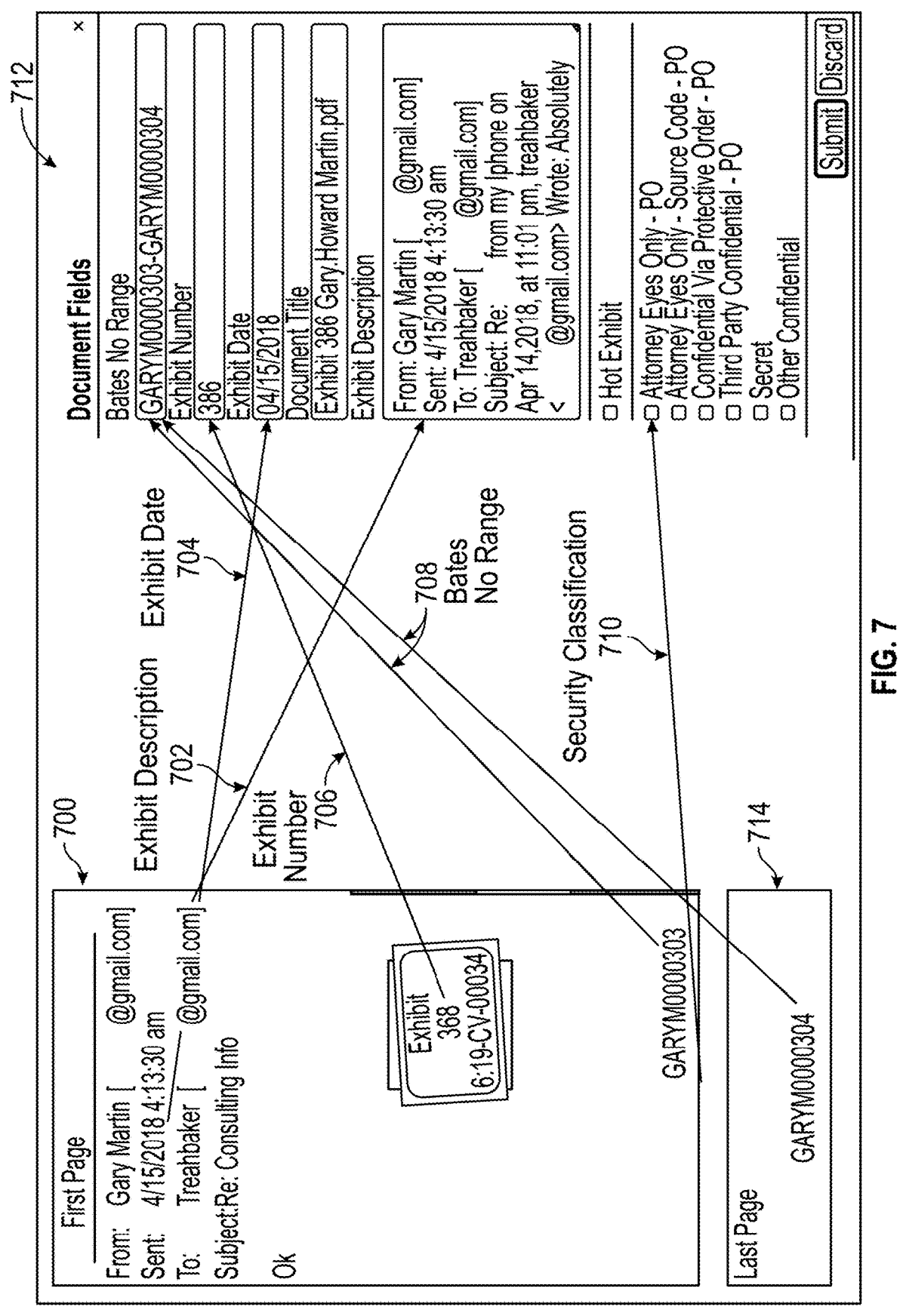

Referring now to FIG. 7 an exemplary illustration of the process of extracting meta-data from documents 700, is described in more detail. The document fields 712 for an exhibit include fields such as Bates Number Range, Exhibit Number 706, Exhibit Date 704, Document Title, Exhibit Description 702, Hot Exhibit, and Security Specifications (such as Attorney Eyes Only—PO, Attorney Eyes Only—Source Code—PO, Confidential via Protective Order—PO, Third Party Confidential—PO, Secret, Other Confidential). When an exhibit is ingested into an inbound folder within CatchUp, the AI or Machine Learning models trained for extraction of meta-data extract fields such as exhibit date 704, exhibit description 702, exhibit number 706, bates number range 708 and security classification 710. Additional fields such as Comments, Type of Document (Email, Invoices, Data Sheets, Source Code), Additional Document Type Analytics, Other document features (source, reliability, usefulness), Access Permissions Level (1-10), Usage (Times Viewed), Versions may be added either through manual entry or automated extraction.

Figure 8:
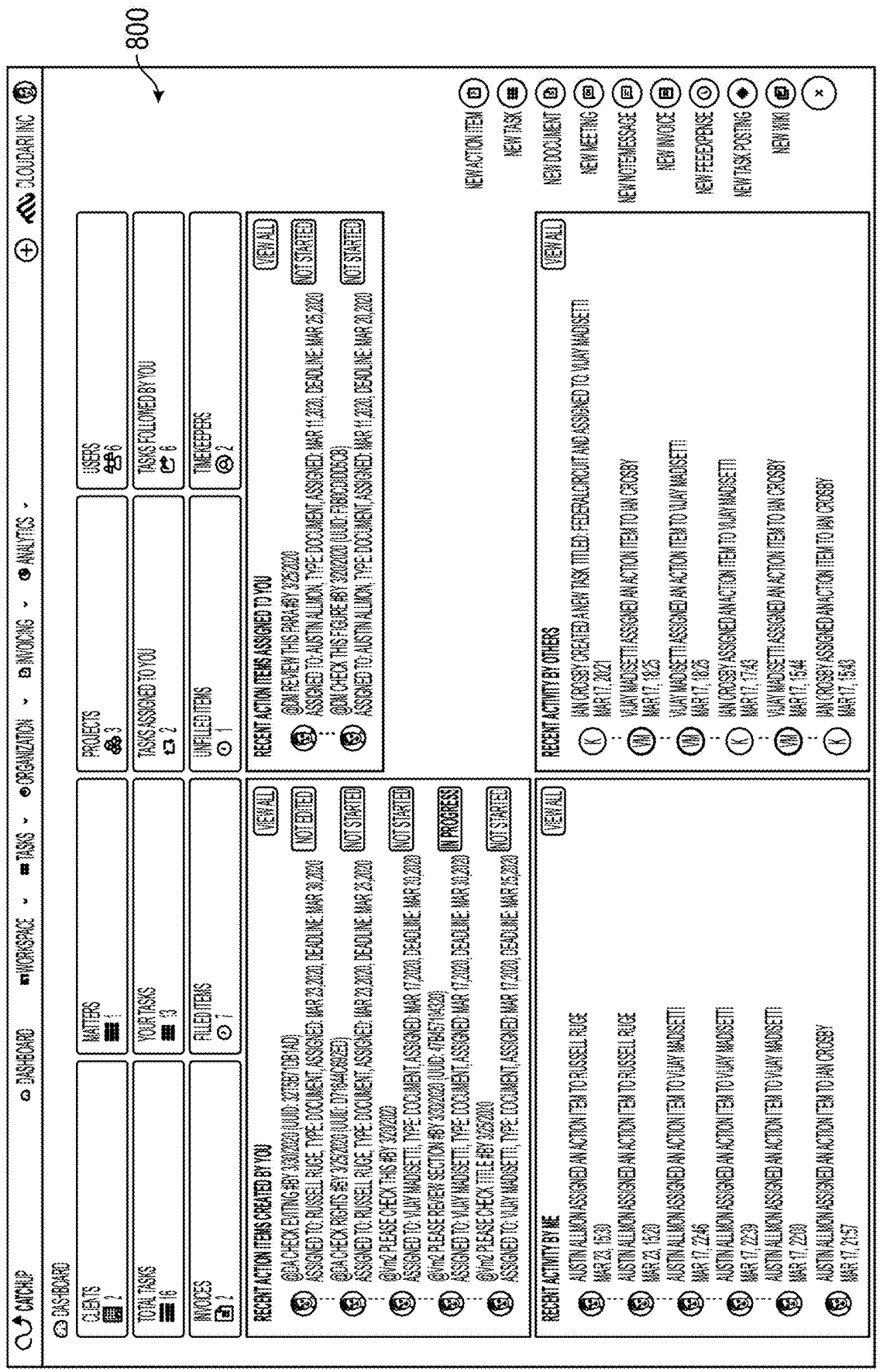
FIG. 8 is an exemplary interface of the CatchUp platform showing dashboard home page, according to an embodiment of the invention.

Referring now to FIG. 8 an exemplary interface 800 of the CatchUp platform showing dashboard home page, is described in more detail. CatchUp is packed with loads of features to enable effective collaboration within your business such as task scheduling, document management, file sharing, collaboration, real-time communications, reminders, calendar, wiki, resource planning, mapping to business and process-specific task flows, invoicing, advanced analytics, blockchain certifications and more. Within CatchUp each organization can have multiple clients. Each client can have multiple Business Specific Task Structures including matters, projects, tasks and users. CatchUp focuses on short term tasks that require coordination. Each task has a set of notes organized as a running timeline that is like a chat. Users can exchange notes for a particular task and add attachments to task notes. Users can provide immediate feedback, ask questions, request updates for tasks and add fee or expense items to tasks. The advanced analytics features in Catchup allow users to get a big picture on tasks and projects, generate a circle of knowledge and let the team members understand their roles. Users can share knowledge and unleash collective intelligence for your business through wiki and bulletin boards.

Figure 9:
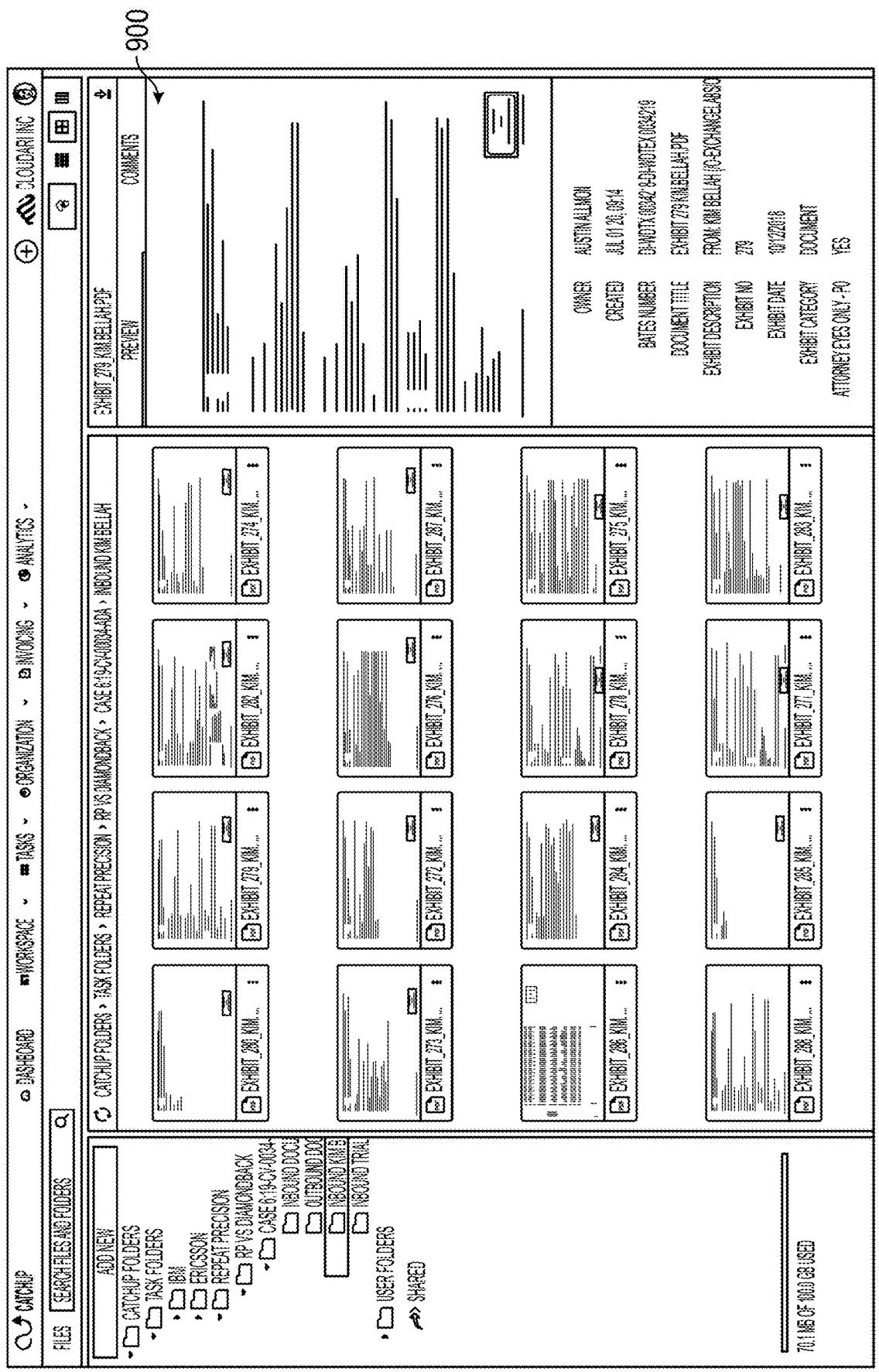
FIG. 9 is an exemplary interface of the CatchUp platform showing user and task folders with the document management system, according to an embodiment of the invention.

Referring now to FIG. 9 an exemplary interface of the CatchUp platform showing user and task folders with the document management system, is described in more detail. Catchup features an enterprise grade document management system to create, share and collaborate on documents in real-time. Within the documents view, users can browse documents within the task folders and user folders, view preview and details of a document and add comments to documents. The comments can either be visible to all users (public comments), or specific group of users (closed user group comments) or only a particular user (private comments). This selective visibility of comments is enabled by hashtags and mention codes within the comments.

From the Workspace→Documents page, open the task folder for the task created in step 6, as shown 900 in FIG. 9. Click on the Add New button and select Upload file option and select one or more files to upload to the task folder. When an exhibit is uploaded, CatchUp automatically extracts meta-data such as exhibit number, bates number range, exhibit date, exhibit description and security specification. You can view and edit this meta-data by right clicking on an exhibit and selecting the Document Fields option. Exhibits which are uploaded to a task folder related to task which has been linked to a specific event are automatically linked to the event. Whereas, exhibits which are uploaded to a task folder related to task which is not linked to any event can be manually linked to events by right clicking on the exhibit and selecting the Link to Event option.

Referring now to FIG. 10 an exemplary interface 1000 of the CatchUp platform showing events roster, is described in more detail. The events can be of types Deposition, Trial, Markman hearing, MSJ hearing, for instance. Events can have attributes such as witness name, date, attorney name, for instance.

Referring now to FIG. 11 an exemplary interface 1100 of the CatchUp platform showing event creation dialog, is described in more detail. In this dialog the event fields such as Event Type (Deposition, MSJ, Markman, Trial, Other), Date, Witness Name, Location, Attorney Name, Video (Yes/No), Signed (Yes/No), Corrected (Yes/No), Hard Copy (Yes/No), Disk (Yes/No), Added to Chron (Yes/No), Link to Transcript Rough, Link to Transcript Final, Link to Video, and Court Reporting Firm are entered.

Referring now to FIG. 12 an exemplary interface 1200 of the CatchUp platform showing court case creation dialog, is described in more detail. In this dialog the court fields such as Case Number, Judge, Clerk, Title of Case, People, Plaintiff, Petitioner, Defendant, Respondent, Court, Date Filed, Linked Cases, Lawfirm Plaintiff and Lawfirm Defendant are entered.

Figure 13:
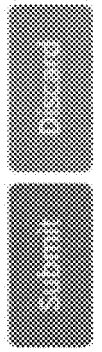
FIG. 13 is an exemplary interface of the CatchUp platform showing document to event linking dialog, according to an embodiment of the invention.

Referring now to FIG. 13 an exemplary interface 1300 of the CatchUp platform showing document to event linking dialog, is described in more detail. In this dialog the linking fields such as Link Type, Event, Deposition Exhibit No, Trial Exhibit No, Exhibit Category, Trial Exhibit (Yes/No), Marked (Yes/No), Offered (Yes/No), Objection (Yes/No) and Admitted (Yes/No) are entered.

Referring now to FIG. 14 an exemplary interface 1400 of the CatchUp platform showing exhibit analytics, is described in more detail. In the Exhibit Analytics page, the user selects a client, matter and project and then clicks on load button. A list of exhibits and events and the linking of exhibits to events is displayed to the user. Use can then export an excel list of exhibits or download a zip archive of exhibits.

Referring now to FIG. 15 an exemplary interface 1500 of the CatchUp platform showing task notes and real-time communication, is described in more detail. CatchUp focuses on short term tasks that require coordination. Tasks can be filtered by user (creator, assignee or follower), client, project, matter and tags. Tasks have a set of notes organized as a running timeline that is like a chat. Attachments can be added to the task notes. Users can provide immediate feedback, ask questions, request updates for tasks and add fee or expense items to tasks.

Figure 16:
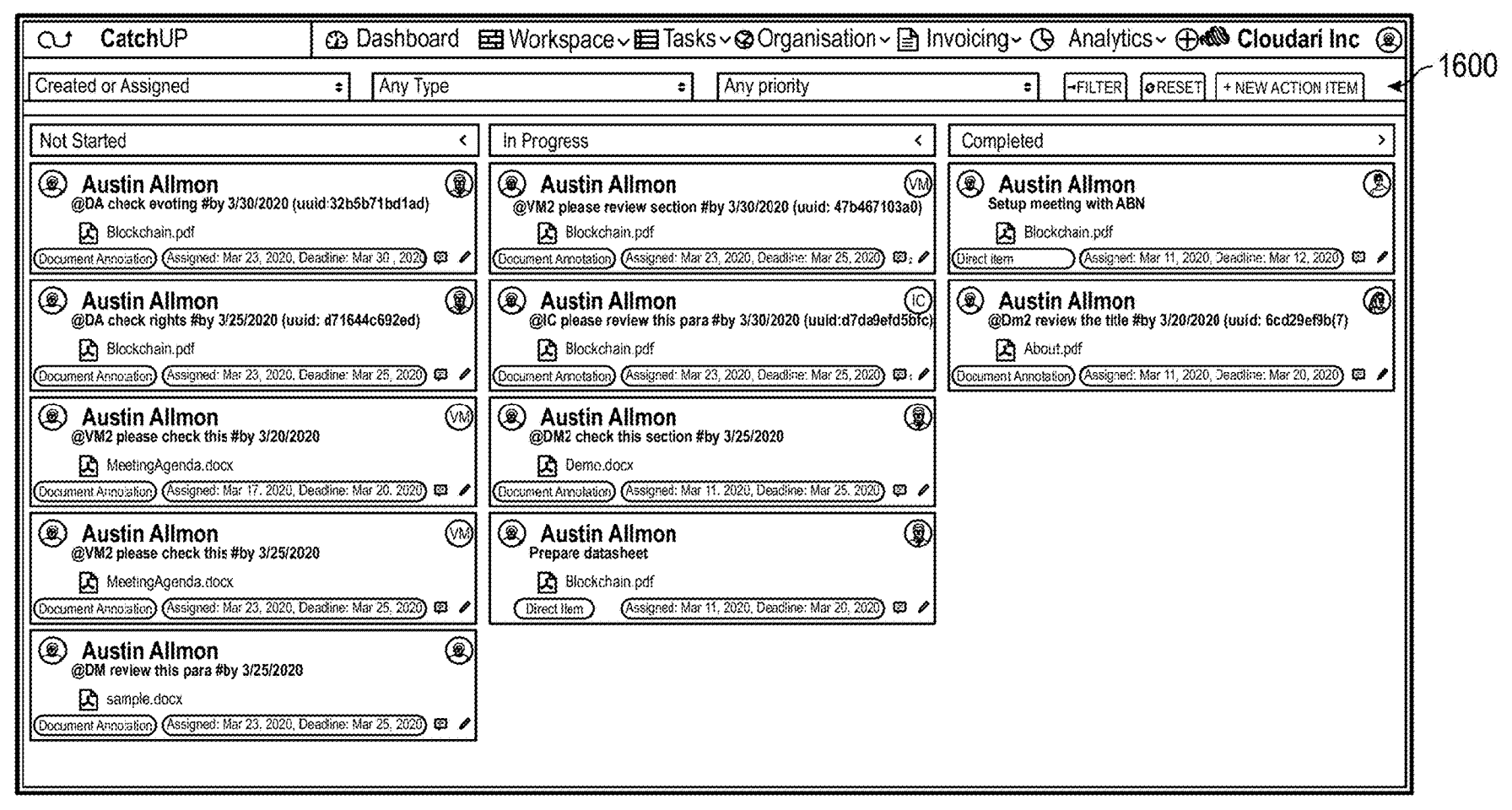

Referring now to FIG. 16 an exemplary interface 1600 of the CatchUp platform showing kanban view of action items, is described in more detail. In the kanban view the action items are organized into three columns: Not started, In progress and completed. A user to whom an action item is assigned can update the status of an action item either by double clicking the item or by dragging and dropping the action item card to a different column. Users can add comments to action items. The comments can either be visible to all users (public comments), or specific group of users (closed user group comments) or only a particular user (private comments). This selective visibility of comments is enabled by hashtags and mention codes within the comments.

Figure 17:
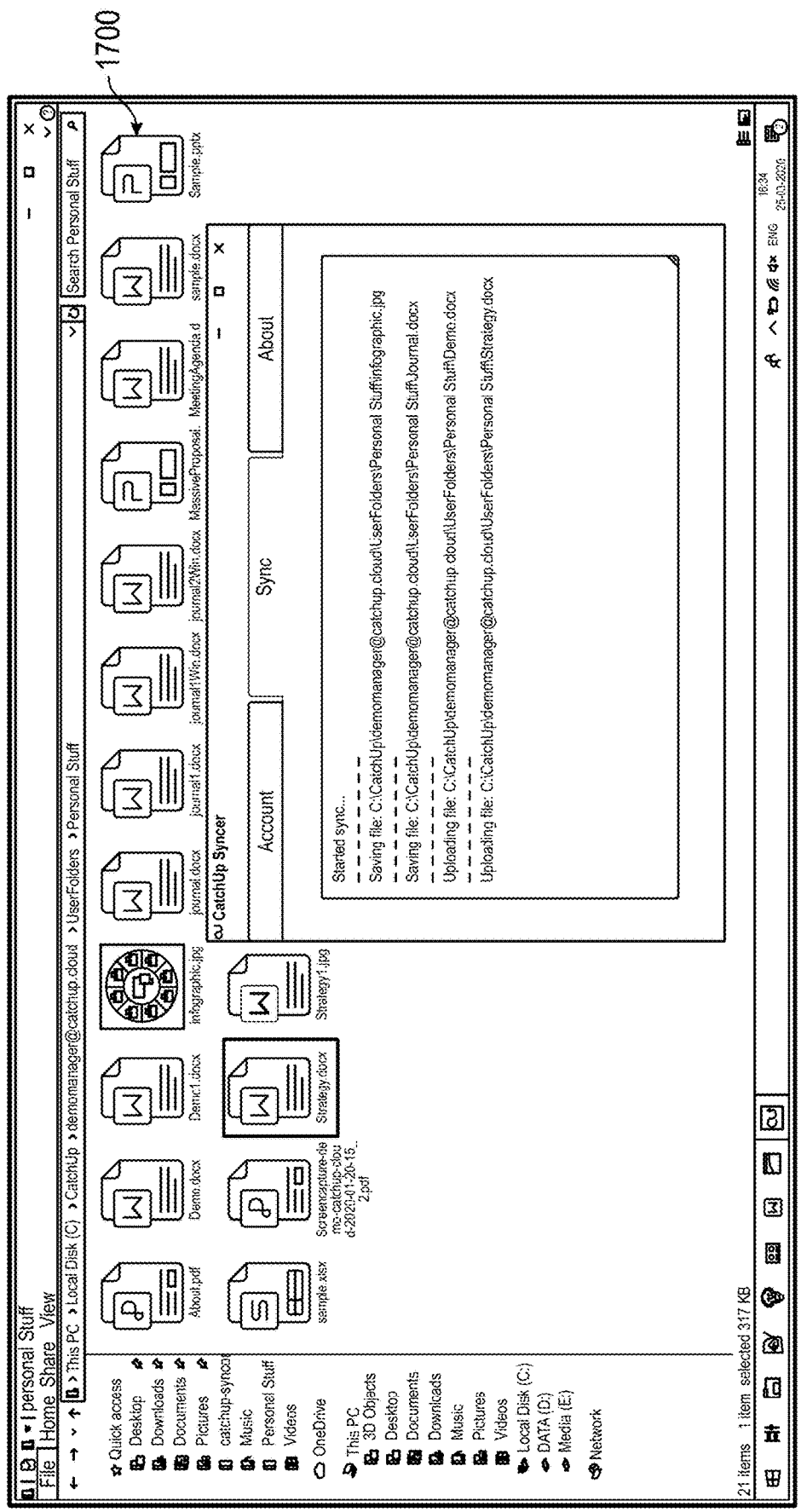
FIG. 17 is an exemplary interface of the CatchUp syncer application, according to an embodiment of the invention.

Referring now to FIG. 17 an exemplary interface 1700 of the CatchUp syncer application, according to an embodiment of the invention. CatchUp syncer is a desktop application which syncs CatchUp folders to user's desktop. CatchUp syncer supports two-way sync from Cloud to Local or from Local to Cloud. When a user launches the CatchUp syncer application and logs into his account the files in the user's Task Folders and User Folders in Catchup Cloud are synced to local machine. When any file is edited or updated in the user folders in Catchup Cloud the newer version of the file is synced to local machine. A user can open an Office document (docx, pptx, xlsx) in any desktop office application (such as MS Office or OpenOffice) and edit the document. When the document is saved it is synced to the CatchUp cloud. If a user copies a new file to a local sync folder the file is uploaded to the cloud.

Figure 18:
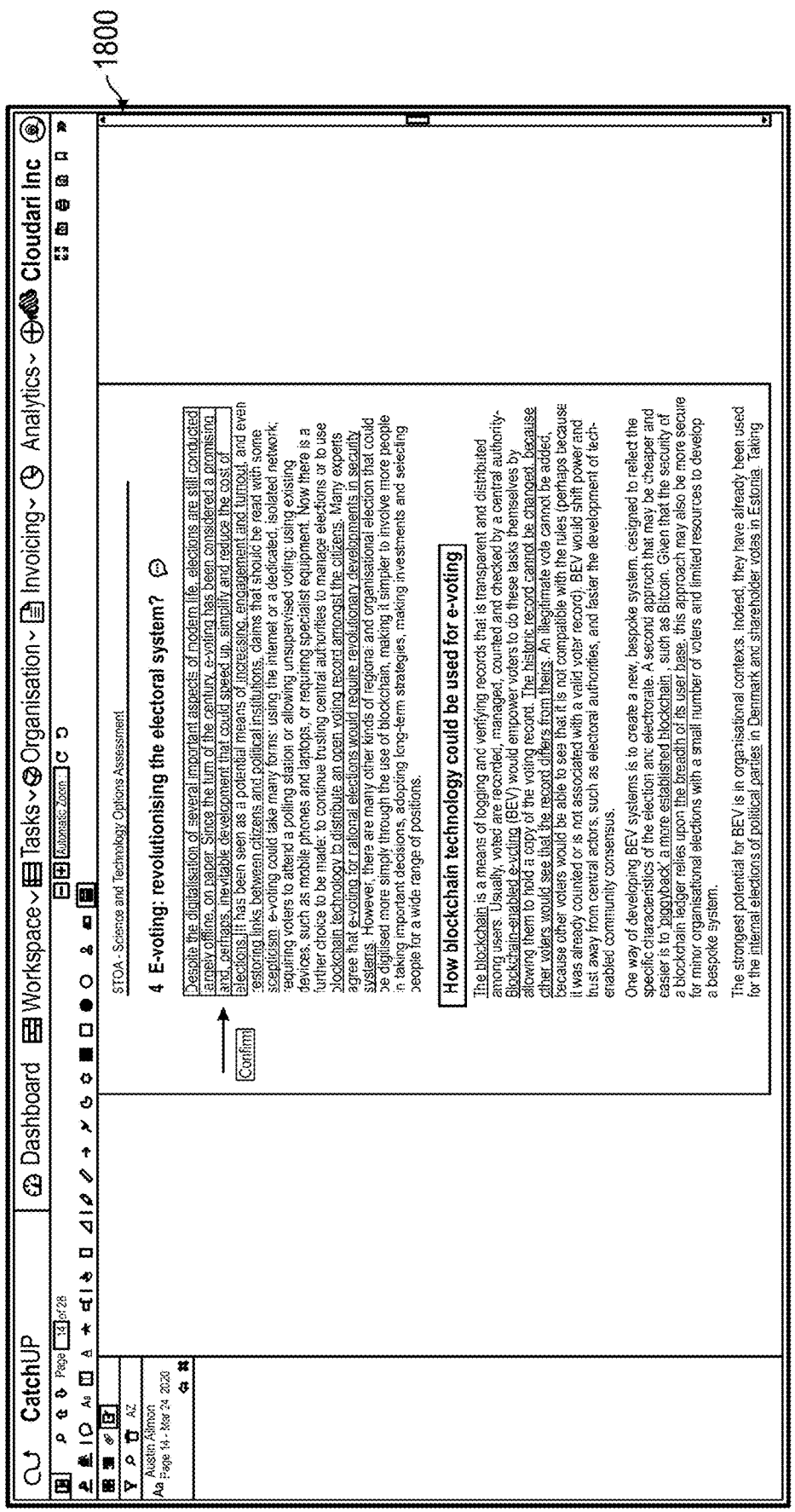
FIG. 18 is an exemplary interface of the CatchUp Glass Viewer for PDF documents, according to an embodiment of the invention.

Referring now to FIG. 18 an exemplary interface 1800 of the CatchUp Glass Viewer for PDF documents, is described in more detail. CatchUp Glass Viewer is a document editor application is used to view, edit, comment and annotate documents. The comments and annotations are saved separately outside the PDF document in a meta-data database within the CatchUp cloud. When a document is opened with the Glass Viewer the document is fetched from the cloud storage and comments/annotations are fetched from the meta-data database and rendered in a layer above the document.

Figure 19:
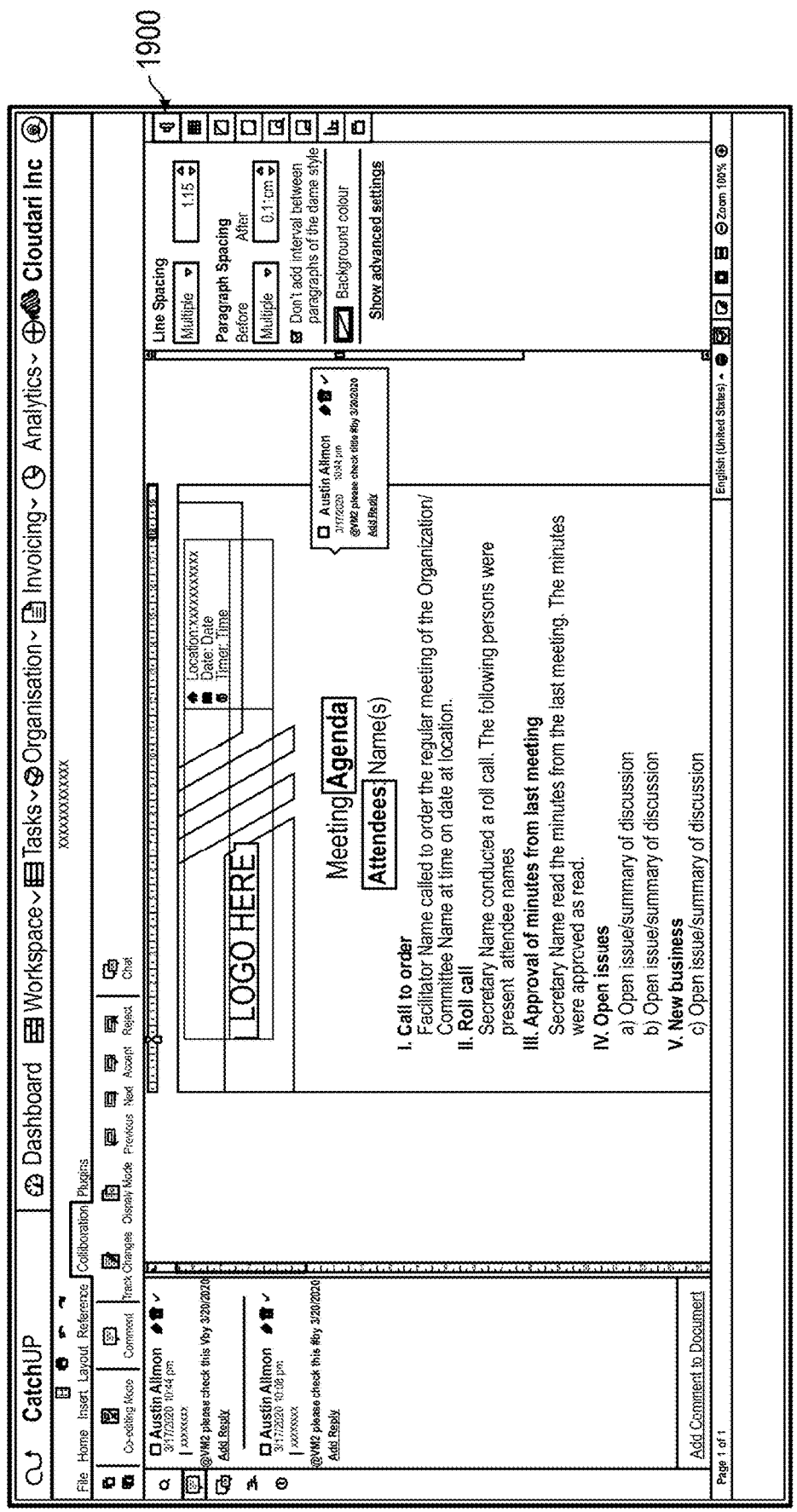
FIG. 19 is an exemplary interface of the CatchUp Glass Viewer for office format documents, according to an embodiment of the invention.

Referring now to FIG. 19 an exemplary interface 1900 of the CatchUp Glass Viewer for office format documents, is described in more detail.

Figure 20:
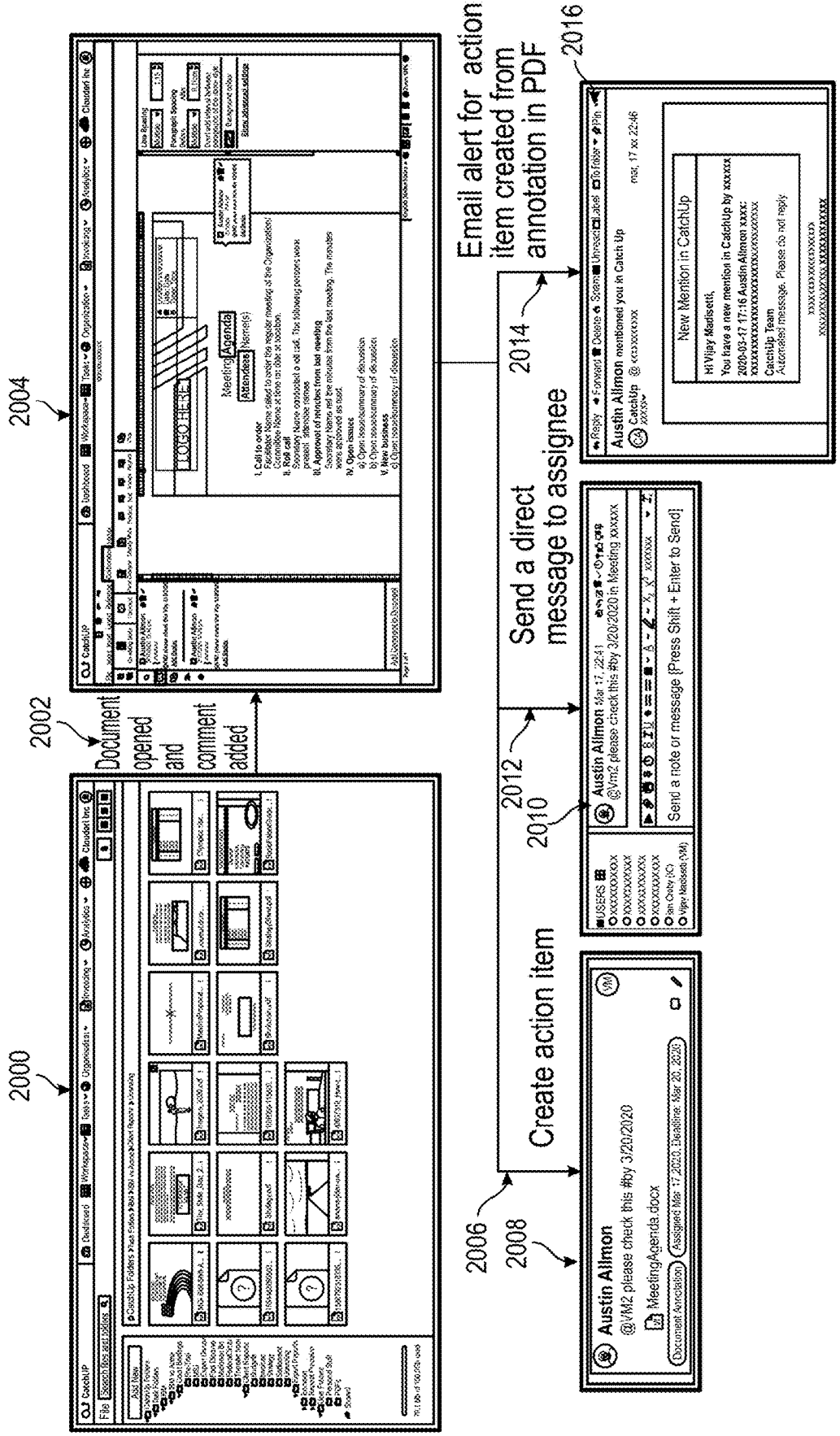
FIG. 20 is an illustration of the online process for creating action items and alerts from comments in office documents, according to an embodiment of the invention.

Referring now to FIG. 20 an illustration of the online process for creating action items and alerts from comments in office documents, is described in more detail. A user can browse a documents within the user or task folders using the CatchUp document management interface 2000 and open a PDF or Office format document in CatchUp GlassViewer web application 2004 and add comments and annotations to the document 2002. Within a comment the user can mention another user and assign some action item with deadline and optional number of hours. For example, "@AB spend #hours 2-3 on reviewing this section #by Mar. 25, 2020". When the annotations are saved the comments are parsed and action items are created 2006. The action item can be seen from the Kanban view 2008. The CatchUp Server may send a direct message 2012 with the CatchUp messaging view 2010 and also may send 2014 an email alert 2016 when the action item is created.

Figure 21:
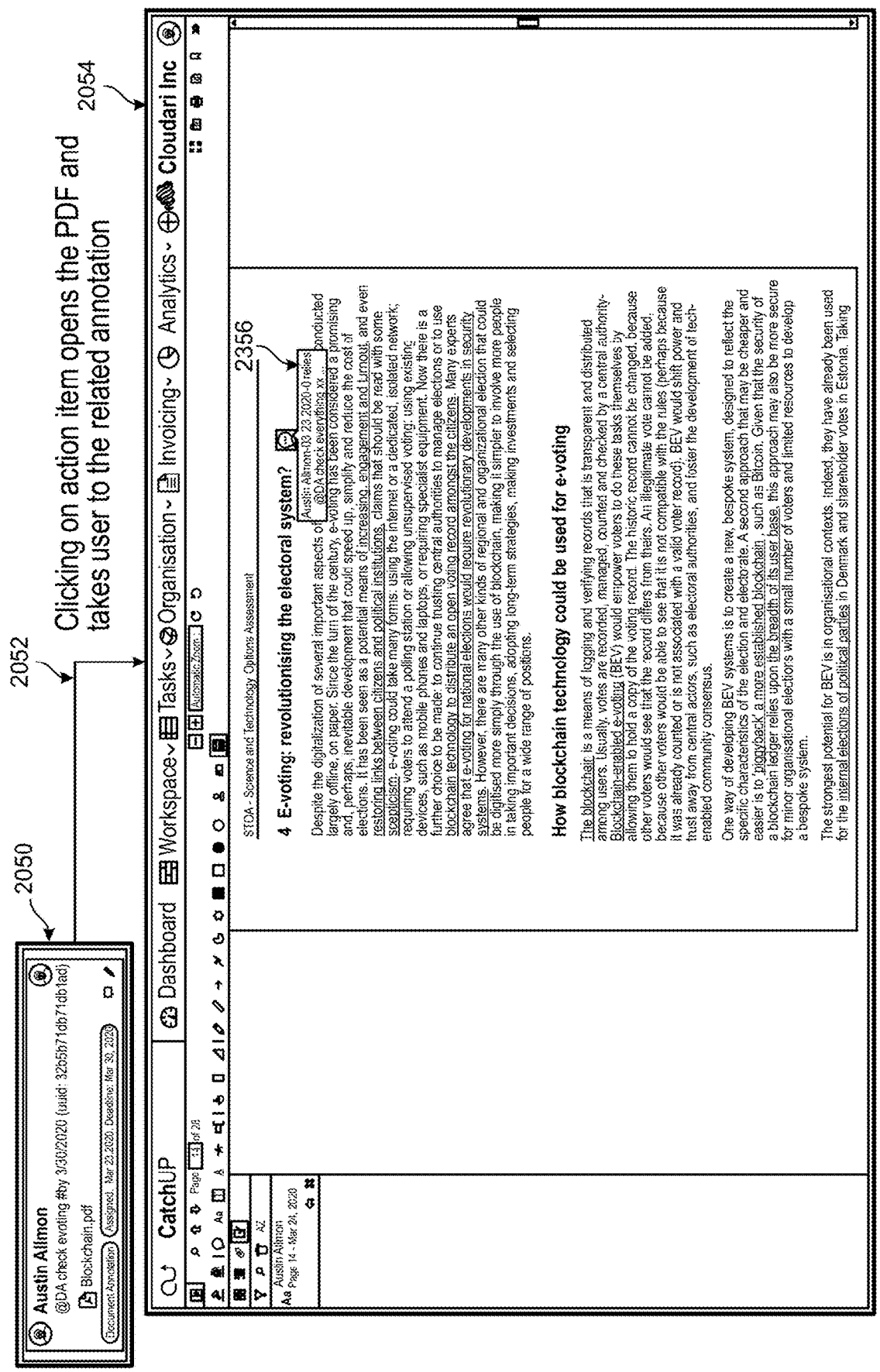
FIG. 21 is an illustration of the linking between an action item and the corresponding annotation within a document, according to an embodiment of the invention.

Referring now to FIG. 21 an illustration of the linking between an action item and the corresponding annotation within a document, is described in more detail. From the Kanban view 2050, when the user clicks an action item 2052, it opens the document within the CatchUp Glass Viewer 2054 and jumps directly to the related annotation/comment 2056.

Figure 22:
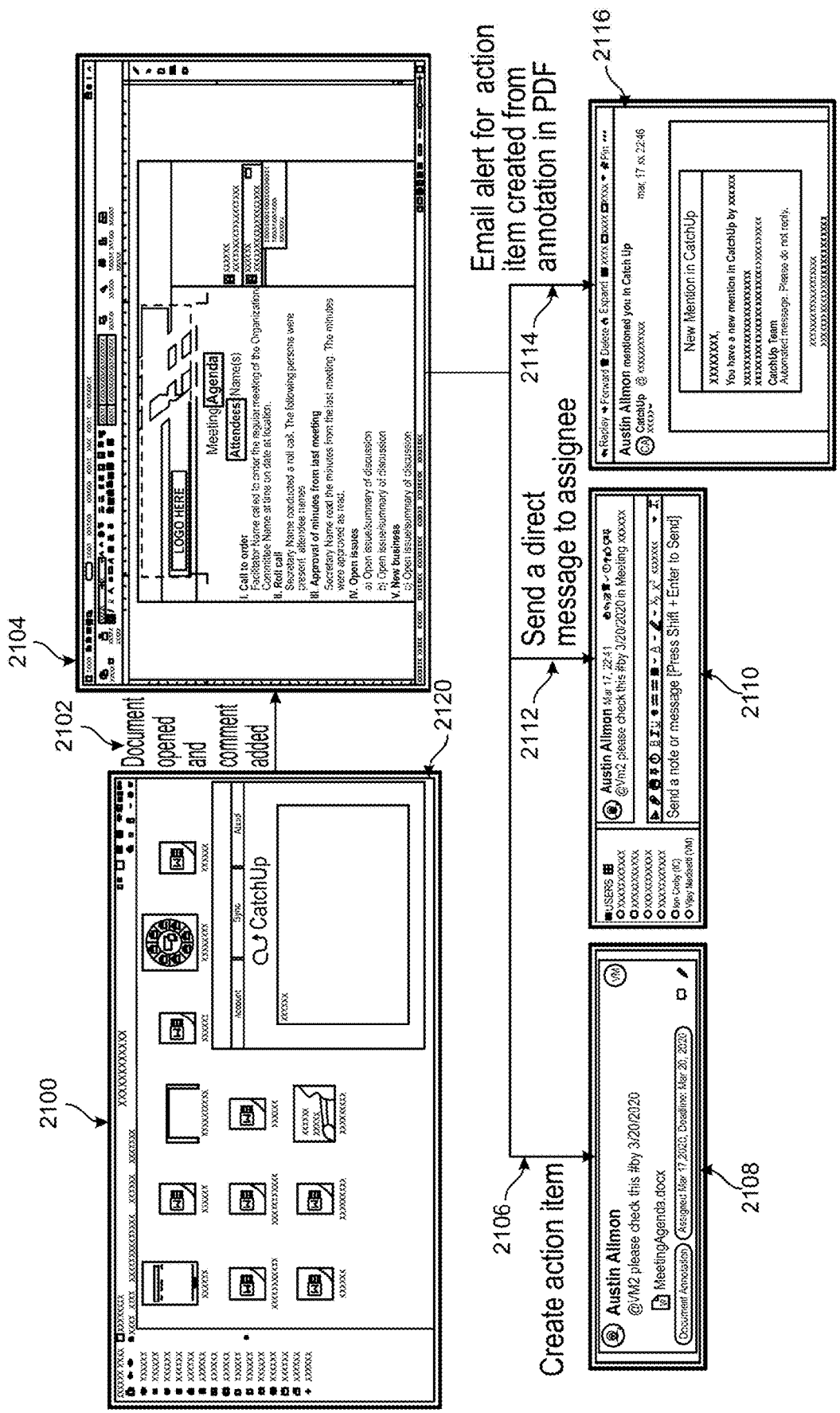
FIG. 22 is an illustration of the offline process for creating action items and alerts from comments in office documents, according to an embodiment of the invention.

Referring now to FIG. 22 an illustration of the offline process for creating action items and alerts from comments in office documents, is described in more detail. A user can browse a documents within the user or task folders synchronized to the user's local machine 2100 using the CatchUp syncer application 2120 and open a PDF or Office format document in a native desktop application 2104 and add comments and annotations to the document 2102. Within a comment the user can mention another user and assign some action item with deadline and optional number of hours. For example, "@AB spend #hours 2-3 on reviewing this section #by Mar. 25, 2020". When the document is saved it is synced to the CatchUp cloud by the CatchUp syncer application 2120. The comments from the synced document are parsed and action items are created 2106. The action item can be seen from the Kanban view 2408. The CatchUp Server may send the user a direct message 2112 with the CatchUp messaging view 2410 and also may send 2114 an email alert 2416 when the action item is created.

Figure 23:
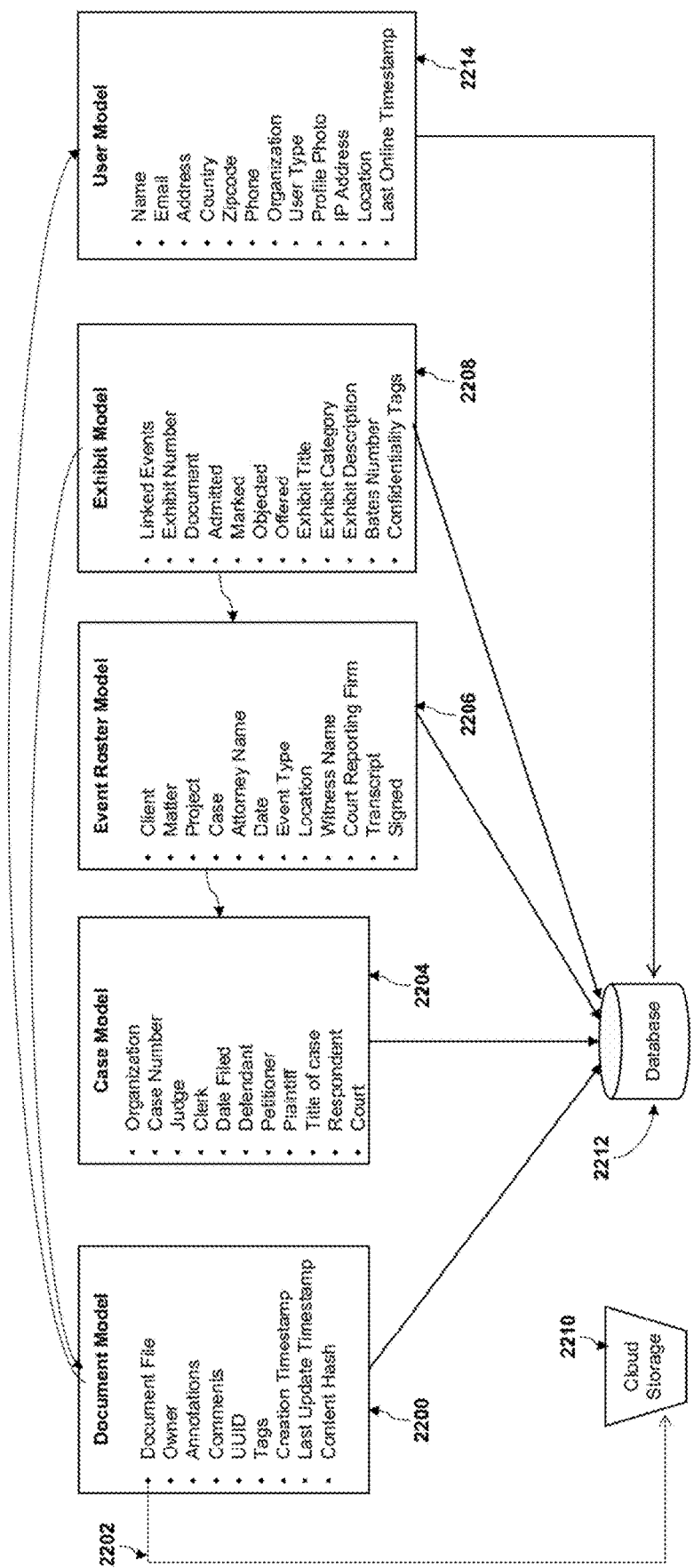
FIG. 23 is a schematic view of data structures maintained within CatchUp for linking of documents to events, according to an embodiment of the invention.

Referring to FIG. 23, the data structures maintained within CatchUp for linking of documents to events, are described in more detail. The Document model data structure 2200 includes a link to the document file which is stored in a Cloud Storage 2210, and additional fields such as Owner, Annotations, Comments, UUID, Tags, Creation Timestamp, Last Update Timestamp and Content Hash. The case details are stored in a separate Case model 2204. The Case model 2204 includes fields such as Organization, Case Number, Judge, Clerk, Date Filed, Defendant, Petitioner, Plaintiff, Title of case, Respondent and Court. The Event Roster model 2206 stores event details and includes fields such as Client, Matter, Project, Case, Attorney Name, Date, Event Type, Location, Witness Name, Court Reporting Firm, Transcript and Signed. The Exhibit Roster model 2208 stores exhibit details and includes fields such as Linked Events, Exhibit Number, Document, Admitted, Marked, Objected, Offered, Exhibit Title, Exhibit Category, Exhibit Description, Bates Number and Confidentiality Tags. While the document file is stored in cloud storage 2210, the document meta-data and document-event linking information is stored in a database 2212. Each of the models may be stored as records in respective databases comprised by the server or within the database 2212.

Figure 24:
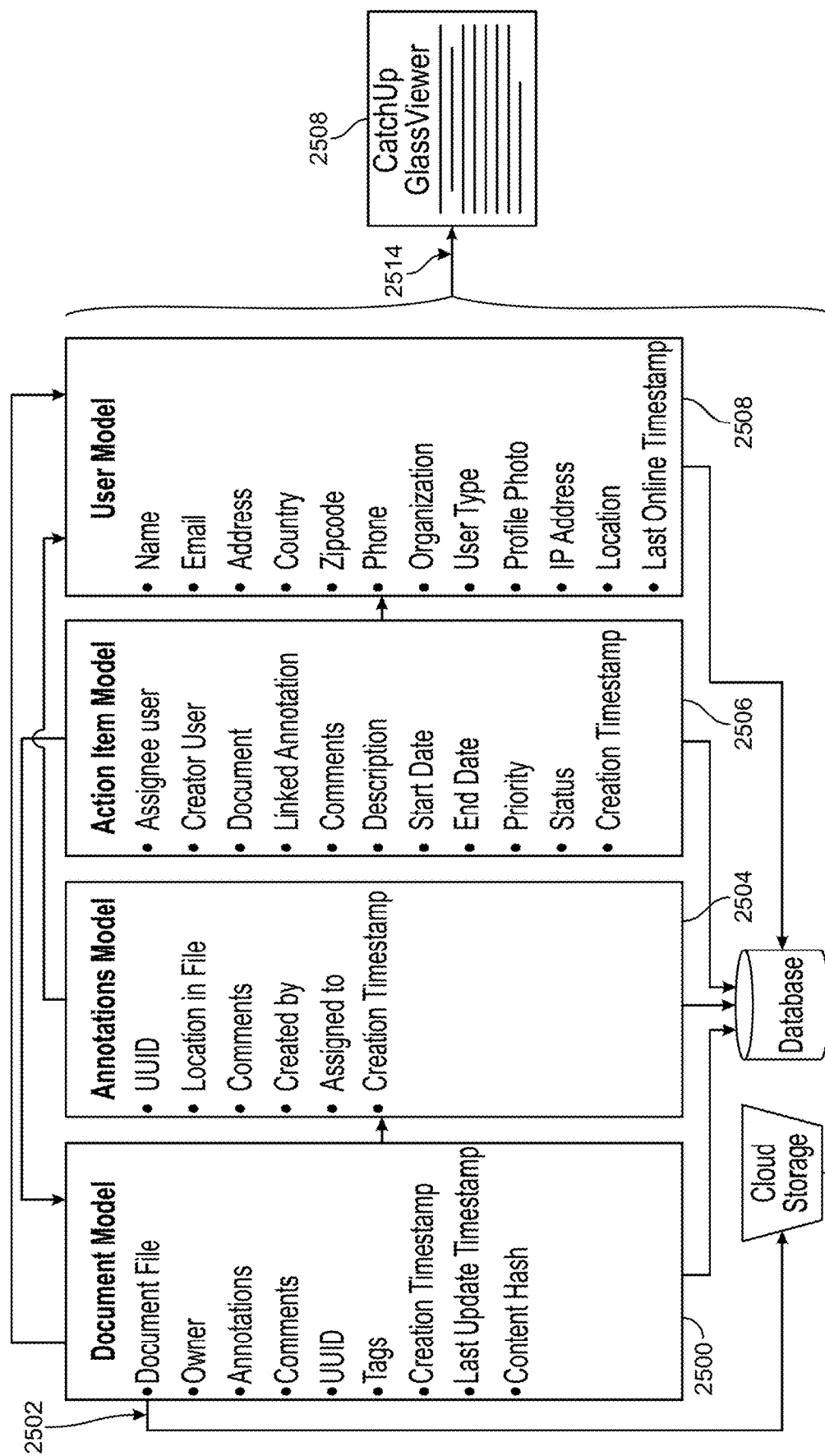
FIG. 24 is a schematic view of data structures maintained within CatchUp for linking of documents to events, according to an embodiment of the invention.

Referring to FIG. 24, data structures maintained within CatchUp for annotations and action items linked to documents, are described in more detail. The document model data structure 2500 includes a link to the document file which is stored in a Cloud Storage 2510, and additional fields such as Owner, Annotations, Comments, UUID, Tags, Creation Timestamp, Last Update Timestamp and Content Hash. The document annotations are stored in a separate Annotations model 2504. The Annotation model 2504 includes fields such as UUID, Location in File, Comments, Created by, Assigned to and Creation Timestamp. The Actions Items created by processing annotations and comments are stored in the Action Item Model 2506. The Action Item model 2506 includes fields such as Assignee User, Creator User, Document, Linked Annotation, Comments, Description, Start Date, End Date, Priority, Status, and Creation Timestamp. The Document, Annotations and Action Item models reference the User Model 2508 which includes fields such as Name, Email, Address, Country, Zipcode, Phone, Organization, User Type, Profile Photo, IP Address, Location, and Last Online Timestamp. While the document file is stored in cloud storage 2510, the document meta-data and annotations are stored in a database 2512. When a document is accessed within the CatchUp Glassviewer, the annotations are rendered in a layer above the document at specific locations.

Referring to the two figures above, the linked data structures allow optimization of resources and speed up computer operations through the merged processing and also allow allocation of faster storage to the more frequent tasks and documents. The use of the multiple data structures and linking between them greatly improves the operation of the computing system, since extensive searching, lookup and calculation is avoided through use of these dynamic links that are evaluated through the linked structures. Unlike previous approaches the linked data structures show which files are most used by the user and can be used to store these files in online and faster storage. Also, files used in secure events can be stored more securely. The linked tables allows offloading to specialized processors and learning networks resulting in 30-50 percent improvement in computer performance.

Figure 25:
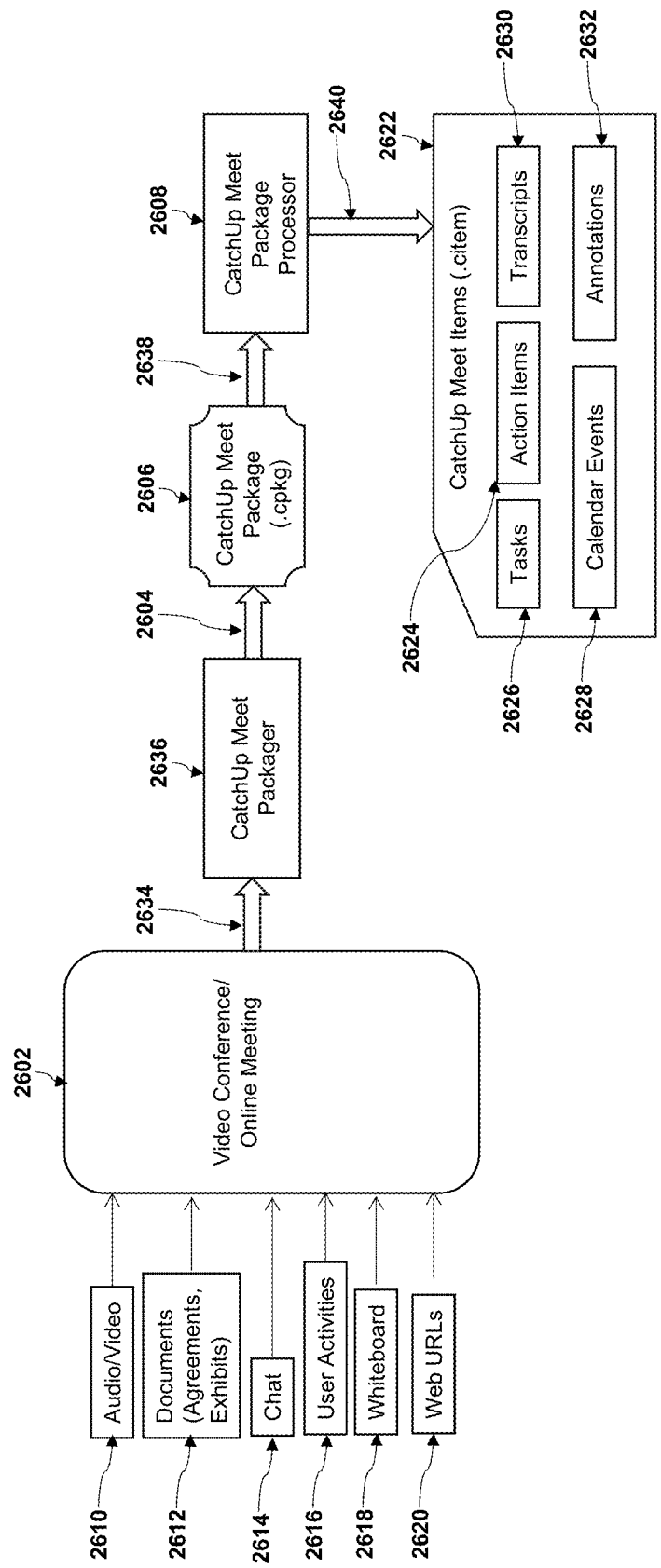
FIG. 25 is an illustration of the creation of CatchUp Meet Package and Items according to an embodiment of the invention.

Referring to FIG. 25, the CatchUp Meet Package and CatchUp Meet Items, are described in more detail. A Video Conference or Online Meeting 2602 comprises audio/video 2610 and may include documents (such as agreements, exhibits and other types) 2612, chat messages sent by participants 2614, user activities (such as questions asked, agreements, votes or any other type) 2616, whiteboard shared during the meeting 2618, and web URLs shared during the meeting 2620. The CatchUp Meet Packager 2636 receives 2634 and packages 2604 video conference/online meeting 2602 along with the audio/video 2610, documents 2612, chat 2614, user activities 2616, whiteboard 2618, web URLs 2620 and any other items shared by the participants in the meeting into a package/archive, referred to as the CatchUp Meet Package 2606 (with .cpkg file extension). The CatchUp Meet Package (.cpkg file) 2606 is a recording of the meeting along with all the items shared. The CatchUp Meet Package Processor 2608 accepts 2638 the CatchUp Meet Package (.cpkg file) as input and generates 2640 a CatchUp Meet Items file 2622 (with .citem file extension). The CatchUp Meet Package Processor 2608 utilizes AI, Machine Learning, Image Processing, Audio/Video Processing and Search tools for generating transcripts from audio/video and recognize use of certain phrases (such as CatchUp, generate an action item for user XYZ, for instance). Reference to the related documents, URLs, chat messages may be linked to the audio/video and the corresponding transcript. The CatchUp Meet Package Processor generates Transcripts 2630, Tasks 2626, Action Items 2624, Calendar Events 2628, Annotations 2632 and establishes links/references between them.

Figure 26:
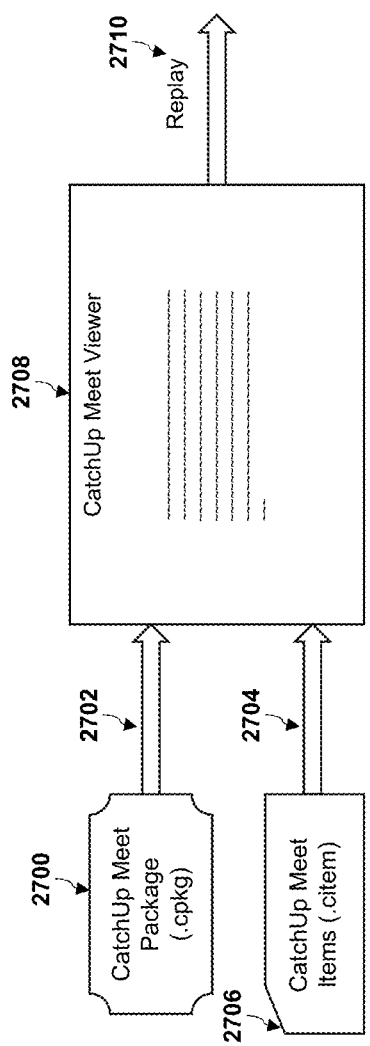
FIG. 26 is an illustration of the replay of CatchUp Meet Package and Items in a CatchUp Meet Viewer according to an embodiment of the invention.

Referring to FIG. 26, the CatchUp Meet Viewer, is described in more detail. The CatchUp Meet Package (.cpkg file) 2700 and CatchUp Meet Items (.citem file) 2706 together allow maintaining the full copies of a video conference/online meeting along with the documents, chat, user activities, whiteboard, web URLs uploaded/used during the meeting, and the Transcripts, Tasks, Action Items, Calendar Events, Annotations that are generated by doing post processing, such that these items are linked to the transcript and are accessible 2702, 2704 and "playable" 2710 along with the video/audio using a CatchUp Meet Viewer 2708.

Figure 27:
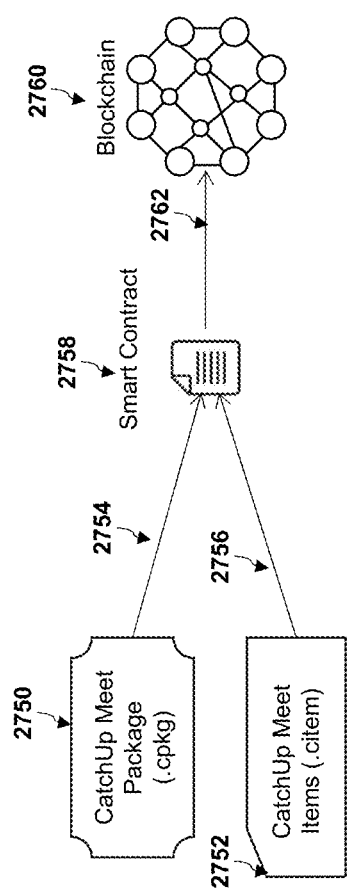
FIG. 27 is an illustration of the certification of CatchUp Meet Package and Items and deployment in a smart contract on a blockchain network according to an embodiment of the invention.

Referring to FIG. 27, the process of certification of CatchUp Meet Package and CatchUp Meet Items on a blockchain, is described in more detail. The CatchUp Meet Package (.cpkg file) 2750 comprising full copies of the audio/video meeting and the documents, chat, user activities, whiteboard, web URLs uploaded/used during the meeting and the CatchUp Meet Items (.citem file) 2752 comprising the Transcripts, Tasks, Action Items, Calendar Events, Annotations that are generated by doing post processing can be hashed, timestamped and certified on a blockchain 2760 by recording the hashes 2754, 2756 within a Smart Contract 2758 that is deployed 2762 on the blockchain or recorded as extra data along with a transaction sent to the blockchain.

Figure 28:
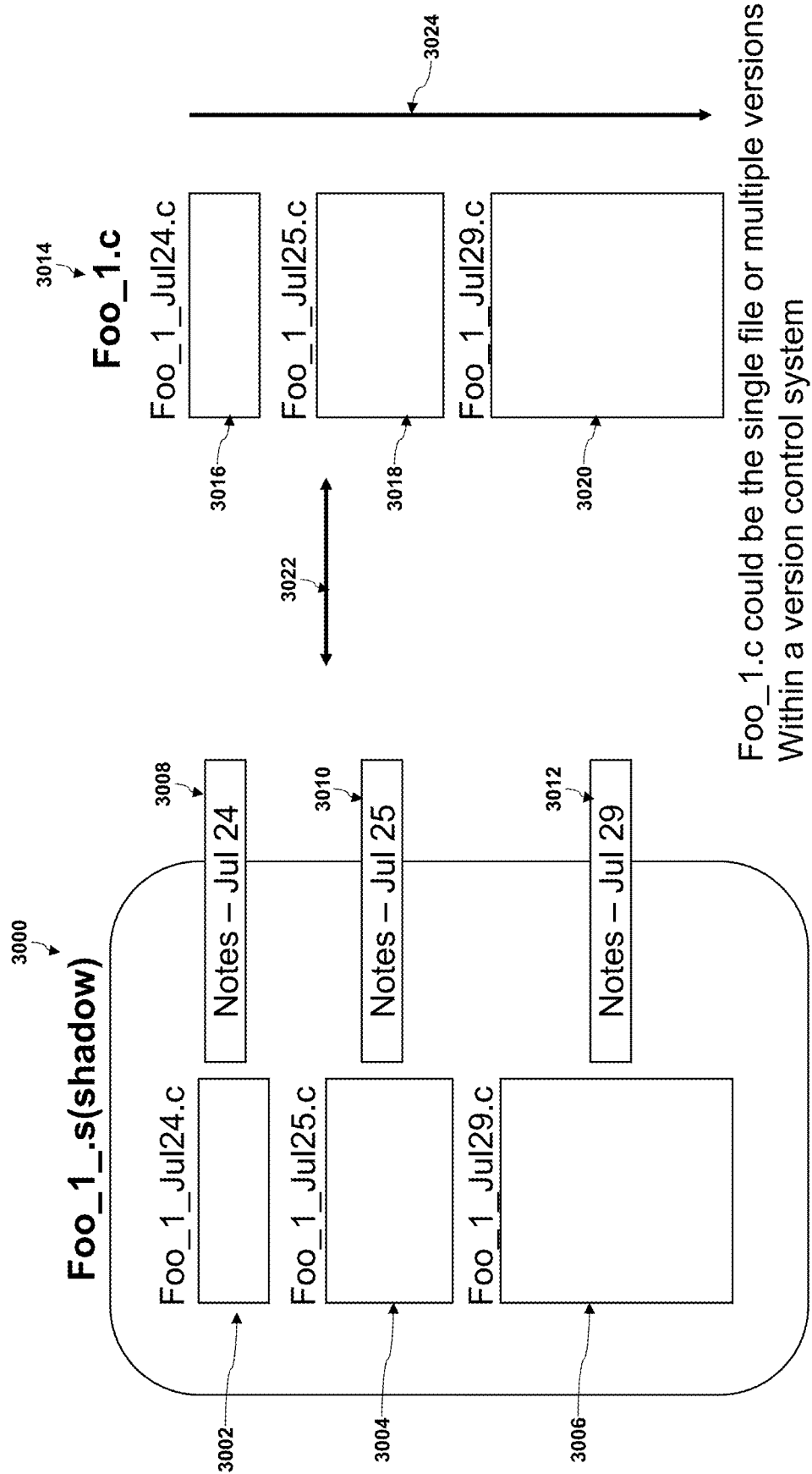
FIG. 28 is an illustration of shadow file with parent folder, according to an embodiment of the invention.

Referring to FIG. 28, an illustration of shadow file with parent folder, is described in more detail. The CatchUp code collaboration tools are integrated with environments that software engineers are comfortable with, such as Git, GitHub, GitLab, BitBucket, VCS, Perforce, and Visual Studio. For each code folder and file 3014, there is a shadow folder and shadow file 3000, along with optional versions merged or abstracted into the shadow file. The shadow folder and file 3000 will be linked logically 3022 (and/or physically) to the original folder and code file 3014. The CatchUp code collaboration tools (including GlassViewer for Code) open the shadow files when the original code file is clicked upon, and store any comments and notes 3008, 3010, 3012 entered by users, by timestamp and by lines of code referenced. As the code file is changed 3024, e.g. originating with a first version of the code 3016, a second version of the code 3018, and a third version of the code 3018, at least one of the new code and the entire file is appended to the shadow code file along with timestamps, such that the shadow code file will comprise a first plurality of lines of code 3002, a second plurality of lines of code 3004, and a third plurality of lines of code 3006 that each correspond to the versions of the code 3016, 3018, 3020 comprised by the code file 3014. The appending to the shadow code file can be done based on a time interval, a code size duration, upon manual triggering by the user, and by any other method or criteria condition as may be known in the art. For example, the new version of the code file 3018, 3020 could be appended to the shadow file 3004, 3006 for that code file every 7 days or 15 days, assuming certain conditions of change occur. Types of change conditions include, but are not limited to, changes to a threshold proportion of the code file, changes to a threshold number of lines of code comprised by the code file, elapsing of a length of time, creation of a new version of the code file, and combinations thereof. There may be no need to append a file that has not changed, for example. Comments are attached to certain lines in certain versions of the code file embedded in the shadow file.

Figure 29:
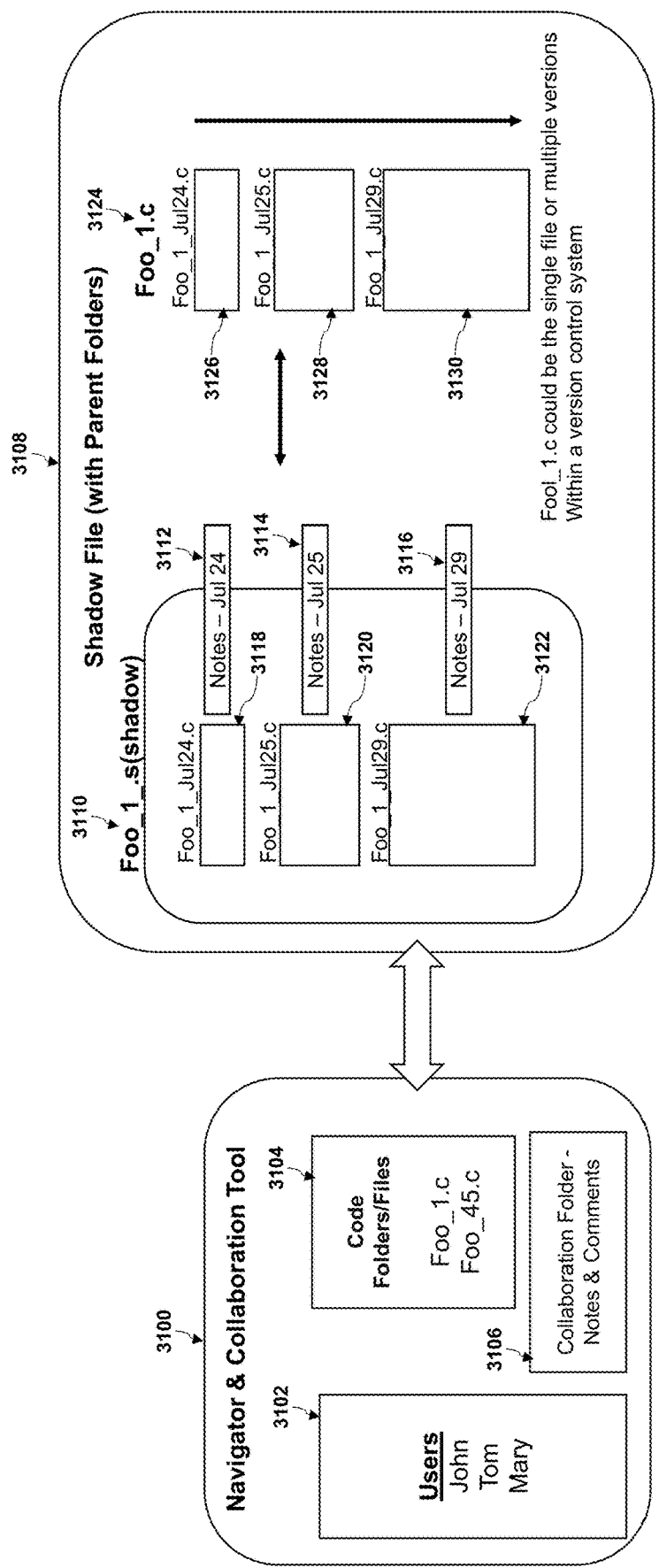
FIG. 29 is an illustration of the navigator and collaborative features in CatchUp, according to an embodiment of the invention.

Referring to FIG. 29, an illustration of the navigator and collaborative features in CatchUp, is described in more detail. The shadow files 3110 and folders 3108 can be modified and analyzed without modifying the actual source code files 3126, 3128, 3130. The source code files 3126, 3128, 3130 may be incrementally added to the shadow code file as corresponding pluralities of code 3112, 3114, 3116. Files or folders 3104 can be checkpointed into it or appended to the shadow folder 3108 over time. The rich notes, design details, and other collaborative information 3106 entered by different users can provide insight. When users 3102 click on certain portions of the source code files 3104 on the right, the CatchUp code collaboration tools 3100 can refer to those portions in the shadow file and extract the linked comments and notes and present them through a rich user interface to the team.

Figure 30:
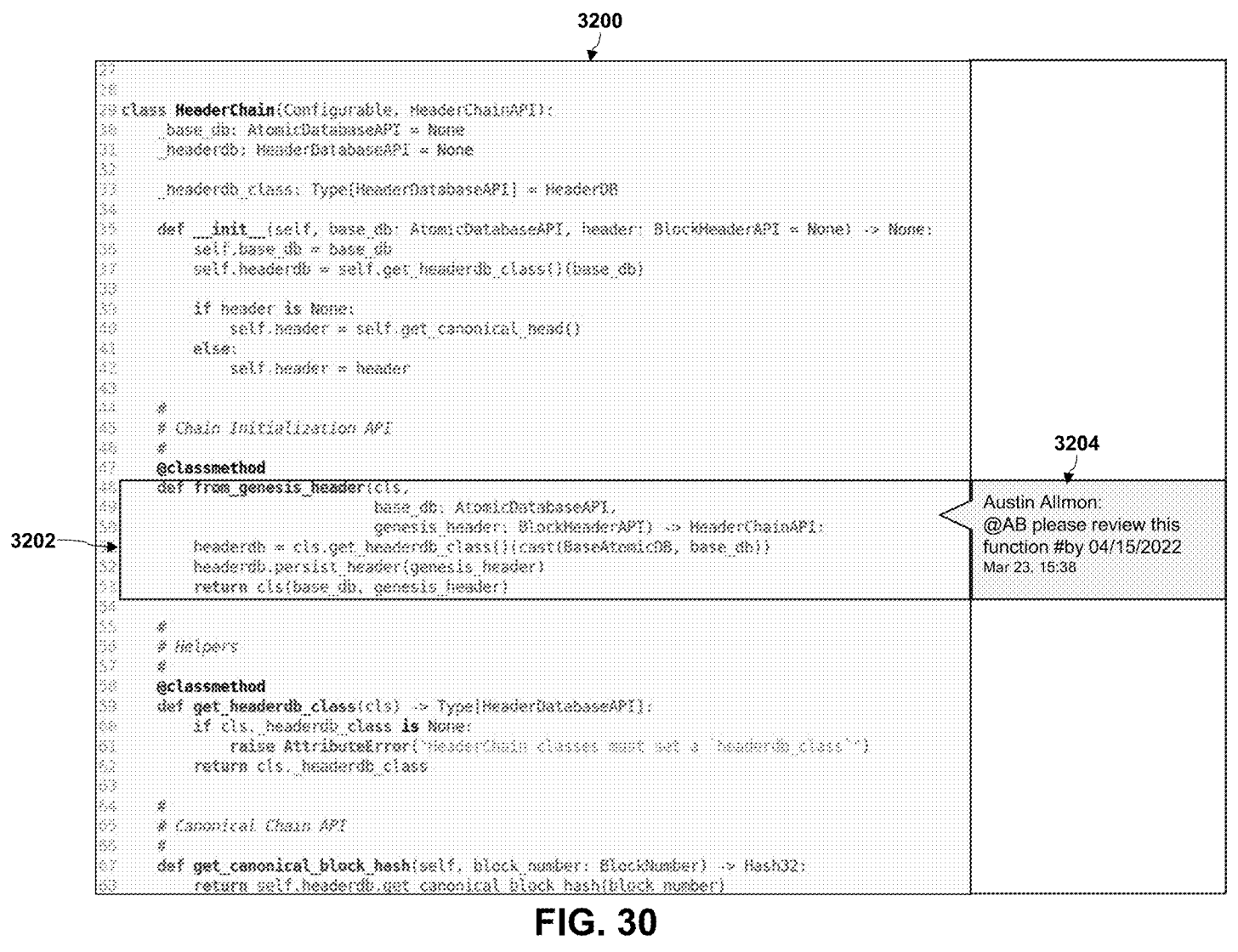

Referring to FIG. 30, an illustration of the CatchUp GlassViewer for Code Collaboration, is described in more detail. The GlassViewer 3200 allows annotating and commenting 3204 the shadow source code files, namely one or more lines of code comprised thereby 3202, linked to the original code files without modifying the actual source code files. In one embodiment, the shadow file can be a PDF file that keeps an appended record of comments made to the code. Whenever changes are made to the code file, it is appended to the shadow PDF file and the pointer to the active pages in the shadow file are updated. The original comments are still linked to the earlier PDF pages that are inactive. For example, if the code file is two pages long, and comments are made to the first two pages, then a two page PDF file comprising a first plurality of shadow code lines that correspond to each code line of a plurality of code lines comprised by the code file as originally saved is created, and when the code file is increased from two pages to four pages, and comments are added to pages 3 and 4, the shadow PDF is increased to six pages and the comments on pages 3 and 4 are moved to a second plurality of shadow code lines comprised by pages 5 and 6 of the now-appended shadow PDF file. The original comments to the first two pages are still left in the first plurality of shadow code lines on pages 1 and 2 of the shadow PDF file. A master parser shows all the comments in a timestamped order, and the first comments when clicked to the first two pages, and the later comments go to pages 5 and 6. This way the system does not have to move comments from earlier portions of the shadow file to later versions. Also, some of the comments to earlier portions of the code file may not make sense in later versions of the code file. As the GlassViewer is scrolled in increasing comments' order, it goes through the following page order in the shadow PDF file-pages 1, 2, 5, 6. Pages 3 and 4 of the shadow PDF file do not comprise the comments seen on pages 1 and 2 or duplicates of those comments. This is very useful in cases such as when there is a function in the code that was removed. In such cases, current tools have no way of knowing or showing this. With GlassViewer approach, the user can go back to those comments that link to the PDF scan of that version of the code linked to that comment and that explains the rationale in the historical archive. The GlassViewer tool keeps snapshots and checkpoints of the code as part of the shadow file providing backup capabilities as well.

Figure 31:
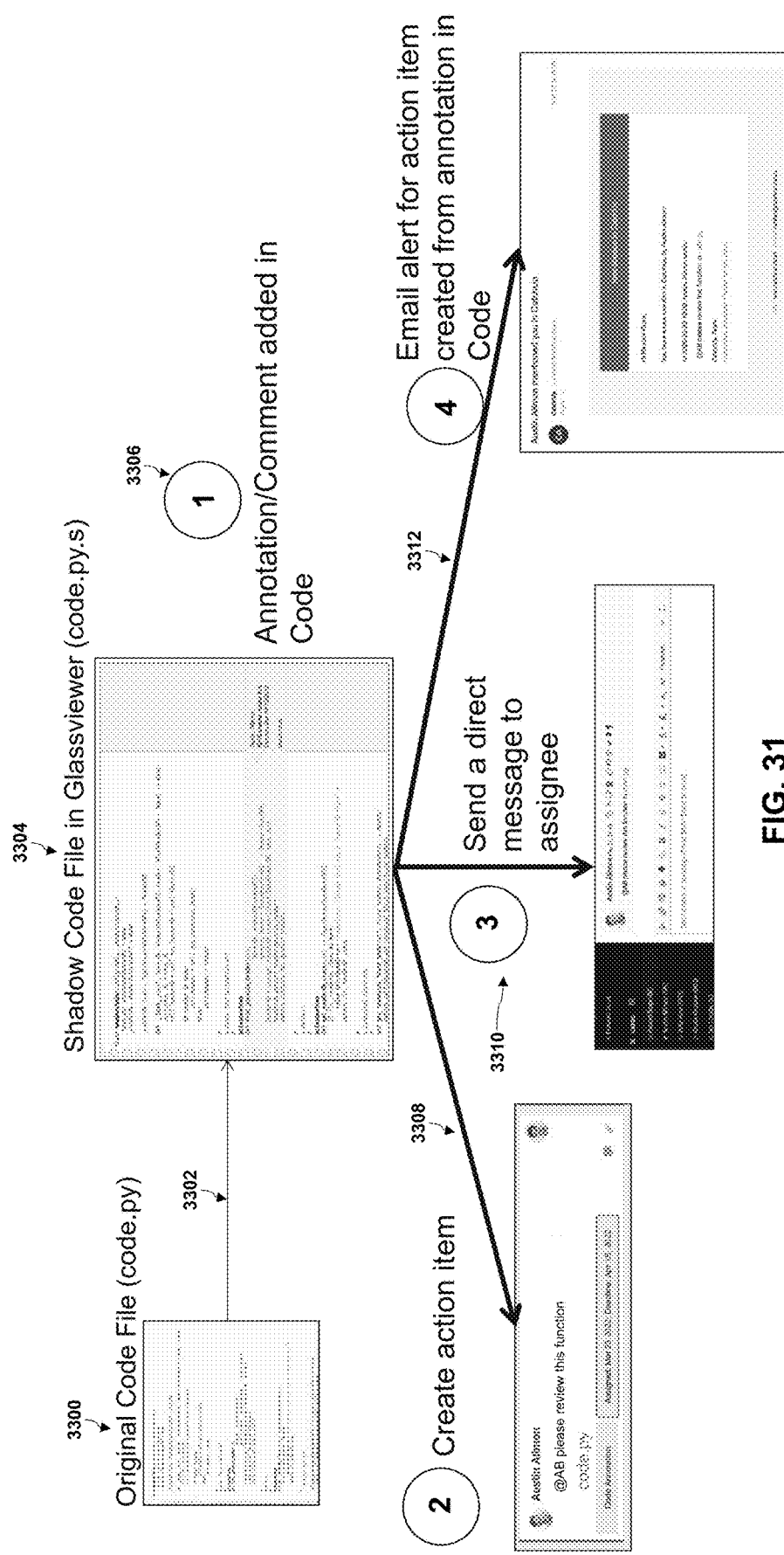
FIG. 31 is an illustration of the process for creating action items and alerts from annotations/comments in code files, according to an embodiment of the invention.

Referring to FIG. 31, an illustration of the process for creating action items and alerts from annotations/comments in code files, is described in more detail. CatchUp features an enterprise grade code collaboration system to develop and collaborate on code in real-time. A user may view and annotate a shadow code file 3304 linked 3302 to an original code file 3300 using the CatchUp Code GlassViewer 3304. The CatchUp Code GlassViewer 3304 allows viewing and annotating code files including comments, text highlighting, and other tools. A user can browse a code file within the CatchUp code management interface and open the code file in CatchUp Code GlassViewer web application 3304 and add comments and annotations 3306, establishing the user as a creating user. Within a comment the creating user can mention another user and assign some action item with deadline and optional number of hours to that user, defining an assigned user. For example, "@AB spend #hours 2-3 on reviewing this function #by Aug. 25, 2022". When the annotations are saved the comments are parsed and action items are created. The action item can be seen from the Kanban view 3308. The CatchUp Server may send a direct message 3310 with the CatchUp messaging view to the assigned user and also may send an email alert 3312 to the assigned user when the action item is created. Annotations in a shadow code file may be viewed and edited by a variety of users, including the creating user, the assigned used, and other users, including users associated with at least one of the code file 3300 and the shadow code file 3304.

Figure 32:
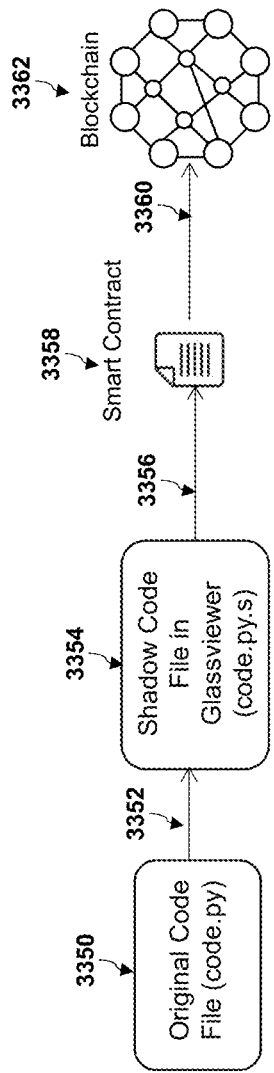
FIG. 32 is an illustration of the certification of code GlassViewer comments in a smart contract on a blockchain network, according to an embodiment of the invention.

Referring to FIG. 32, an illustration of the certification of code GlassViewer comments in a smart contract on a blockchain network, is described in more detail. A code shadow file 3354 linked 3352 to an original code file 3350 comprising annotations and comments can be hashed, timestamped and certified on a blockchain 3362 by recording the hashes 3356 within a Smart Contract 3358 that is deployed 3360 on the blockchain 3362 or recorded as extra data along with a transaction sent to the blockchain 3362.

Figure 33:
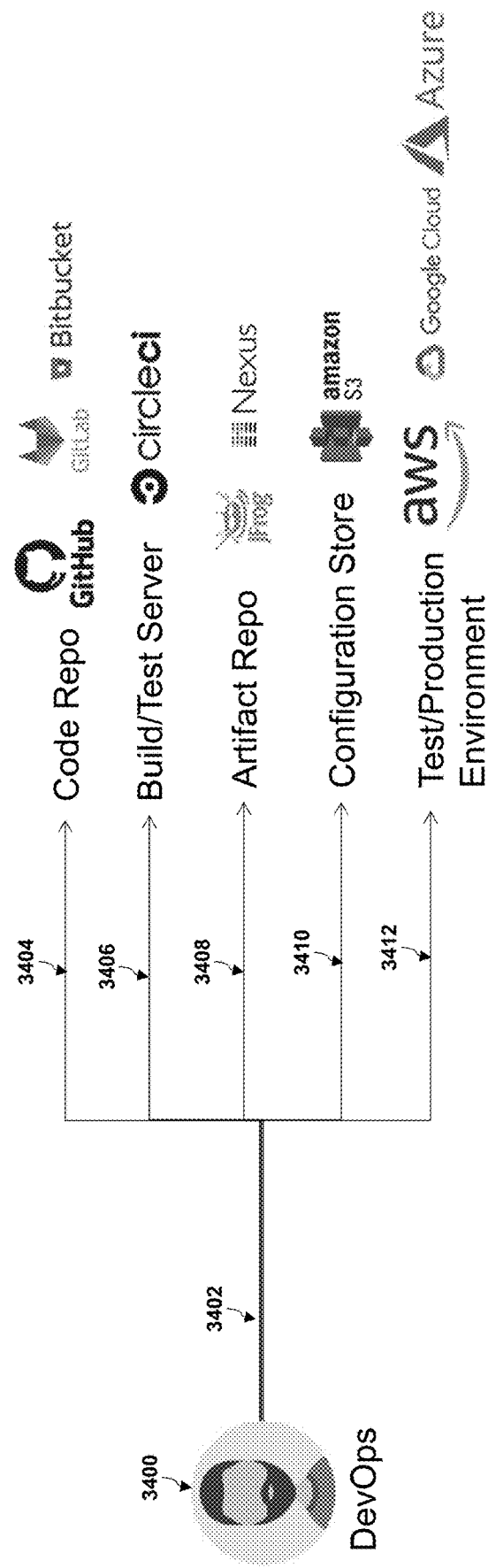
FIG. 33 is an illustration of the existing workflow for DevOps, according to an embodiment of the invention.

Referring to FIG. 33, an illustration of an existing workflow for DevOps, is described in more detail. DevOps teams 3400 have to work with 3402 different set of tools such as Code Repositories 3404, Build/Test Servers 3406, Artifact Repositories 3408, Configuration Stores 3410, and Test/Production Environments 3412. Collaboration with these diverse set of tools is a challenging task for DevOps teams.

Figure 34:
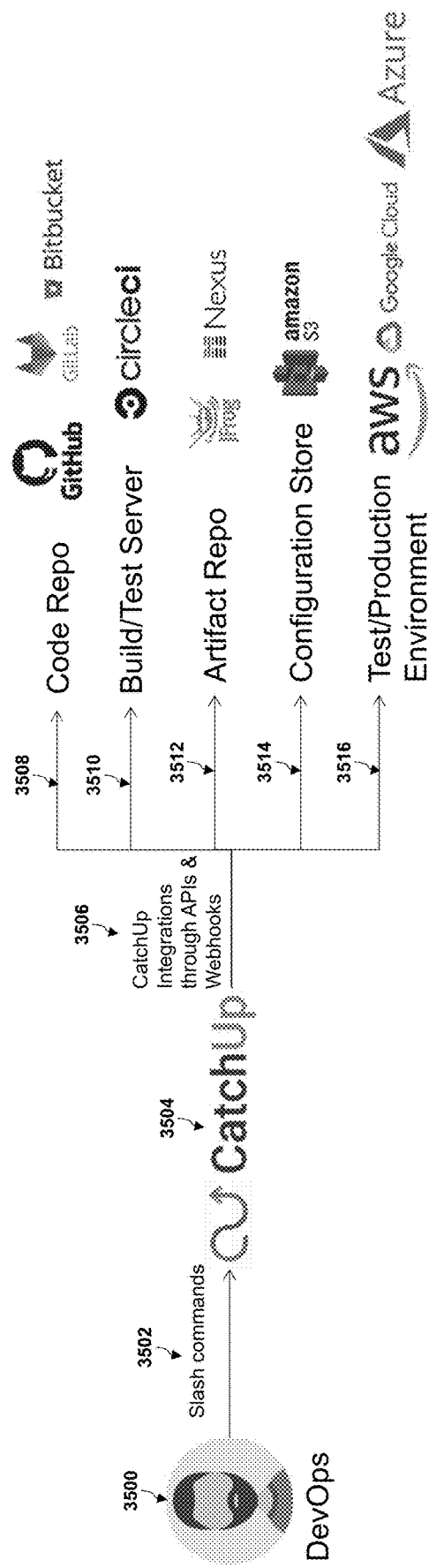
FIG. 34 is an illustration of the improved workflow for DevOps including ChatOps within CatchUp, according to an embodiment of the invention.

Referring to FIG. 34, an illustration of the improved workflow for DevOps including ChatOps within CatchUp, is described in more detail. ChatOps features within CatchUp enable conversation driven collaboration on code. CatchUp uses APIs 3506 for interacting with different services. CatchUp uses Webhooks 3506 for listening to incoming events from different services. Incoming events are posted as messages/notes in CatchUp. Outgoing actions on services are performed with Slash commands. Exemplary features of a code repository integration (such as GitHub, Gillab, Mattermost) are listed below:

1) Reminders: Reminders in the form of messages/notes letting users know what issues and pull requests need their attention.
2) Post actions: Create a GitHub issue from a post or attach a post message to an issue.
3) Update Events: Stay up-to-date with how many reviews, unread messages, assignments, and open pull requests are there.
4) Slash commands: Interact with the GitHub plugin using the/github slash command integration with Mattermost like APIs.
5) Notifications: Get a direct message in CatchUp for events such as:
   i) Issues: Opened or closed issues
   ii) Pulls: New or merged pull requests, as well as draft pull requests
   iii) Commits: New commits on the default branch
   iv) Releases: Published releases
   v) Deployments: Deployment review notifications and Deployment status updates.
   vi) Reviews: Pull request reviews
   vii) Comments: New comments on issues and pull requests
   viii) Branches: Created or deleted branches
   ix) Commits: All commits pushed to any branch
   x) Labels: Filter issues, pull-requests and comments based on their labels.
   xi) Discussions: Discussions created or answered Throughout the application, reference may be made to various computer hardware, including servers, storage, cloud storage, and the like. It is contemplated and included within the scope of the invention that the CatchUp system and its various components may be software executed on computer devices, including servers, personal computers, smartphone devices, and the like, each comprising a processor configured to execute commands received from software (such as microprocessors, field-programmable gate arrays, integrated circuits, and the like), a storage medium positioned in electrical communication with the processor and operable to store software and other digital information thereupon in one or both of transitory and non-transitory status (such as hard disk drives, solid state drives, flash drives, compact flash drives, SD drives, memory, and the like), and a network communication device operable to communicate across computer networks as are known in the art, including, but not limited to, wide area networks such as the Internet and mobile data networks, local area networks such as Ethernet and Wi-Fi networks, and personal area networks such as Bluetooth networks. Accordingly, it is contemplated and included within the scope of the invention that the computer hardware performing the above-described CatchUp functions includes hardware necessary for such performance as is known in the art.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A method for real-time collaboration in software development comprising:
    receiving a code file as a code file type, the code file having content;
    generating a shadow code file responsive to receiving the code file, the shadow code file being a file type other than the code file type and comprising:
        the content of the code file; and
        a link to the code file;
    receiving an annotation to the shadow code file, defining a received annotation, the received annotation comprising annotation content; and
    saving the received annotation in the shadow code file as an annotation record, the annotation record comprising:
        the annotation content;
        a time stamp;
        an indication of an event that created the received annotation;
        a code line identifying at least one line of code comprised by the shadow code filed associated with the received annotation; and
        and at least one of:
            an action item; and
            an assigned user;
    wherein the annotation record does not change the content of the code file; and
    wherein the annotation record can be viewed and edited by a plurality of users.

2. The method of claim 1 further comprising:
    receiving an indication of a change condition related to the code file;
    determining the change to the content of the code file, defining changed content; and
    appending at least one of the entire content of the code file and the changed content to the shadow code file, defining an appended code file.

3. The method of claim 2 wherein the change condition is at least one of a change to a threshold proportion of the code file, a change to a threshold number of lines of code of the code file, and creation of a new version of the code file.

4. The method of claim 3 wherein:
    the change condition is creation of a new version of the code file;
    the shadow code file comprises:
        the content of each version of the code file; and
        a link to each version of the code file.

5. The method of claim 2 wherein:
    the code file comprises a plurality of code lines that have changed over time; and
    the shadow code file comprises:
        a first plurality of shadow code lines that correspond to each code line of the plurality of code lines of the code file as originally saved; and
        a second plurality of shadow code lines comprised by the appended code file that correspond to the plurality of code lines of the code file saved subsequently to the code file as originally saved.

6. The method of claim 5 wherein:
    the first plurality of shadow code lines comprises a first annotation;
    the second plurality of shadow code lines comprises a second annotation; and
    the second plurality of shadow code lines does not comprise the first annotation or a duplicate of the first annotation.

7. The method of claim 6 further comprising:
    receiving a user input selecting the first annotation from a selecting user; and
    displaying the first plurality of shadow code lines to the selecting user.

8. The method of claim 7 wherein the first annotation is associated with a first shadow code line of first plurality of shadow code lines, and wherein the first shadow code line corresponds to a code line of the plurality of code lines that has one of been modified and removed from the code file.

9. The method of claim 1 further comprising:
    receiving a user input to open the code file; and
    opening the shadow code file.

10. The method of claim 1 further comprising:
    applying a hashing function to the shadow code file, generating a shadow code file hash value;
    recording the shadow code file hash value to a smart contract; and
    one of deploying the smart contract on a blockchain and recording the smart contract to a transaction sent to the blockchain.

11. A method for real-time collaboration in software development comprising:
    receiving a code file as a code file type, the code file having content;
    generating a shadow code file, the shadow code file being a file type other than the code file type and comprising:
        the content of the code file; and
        a link to the code file;
    receiving an annotation to the shadow code file, defining a received annotation, the received annotation comprising annotation content;
    saving the received annotation in the shadow code file as an annotation record, the annotation record comprising:
        the annotation content;
        a time stamp;
        an indication of a creating user that created the received annotation;
        a code line identifying at least one line of code comprised by the shadow code filed associated with the received annotation; and
        and at least one of:
            an action item; and
            an assigned user;
    receiving an indication of a change condition related to the code file;
    determining if there has been a change to the content of the code file, defining changed content; and
    upon determining there has been a change to the content of the code file, appending at least one of the entire content of the code file and the changed content to the shadow code file, defining an appended code file.

12. The method of claim 11 wherein:
the code file comprises a plurality of code lines that have changed over time; and
the shadow code file comprises:
- a first plurality of shadow code lines that correspond to each code line of the plurality of code lines of the code file as originally saved; and
- a second plurality of shadow code lines comprised by the appended code file that correspond to the plurality of code lines of the code file saved subsequently to the code file as originally saved.

13. The method of claim 12 wherein:
the first plurality of shadow code lines comprises a first annotation;
the second plurality of shadow code lines comprises a second annotation; and
the second plurality of shadow code lines does not comprise the first annotation or a duplicate of the first annotation.

14. The method of claim 13 further comprising:
receiving a user input selecting the first annotation from a selecting user; and
displaying the first plurality of shadow code lines to the selecting user.

15. The method of claim 14 wherein the first annotation is associated with a first shadow code line of first plurality of shadow code lines, and wherein the first shadow code line corresponds to a code line of the plurality of code lines that has one of been modified and removed from the code file.

16. The method of claim 11 further comprising:
receiving a user input to open the code file; and
opening the shadow code file.

17. The method of claim 11 further comprising:
applying a hashing function to the shadow code file, generating a shadow code file hash value;
recording the shadow code file hash value to a smart contract; and
one of deploying the smart contract on a blockchain and recording the smart contract to a transaction sent to the blockchain.

18. The method of claim 11 wherein the change condition is at least one of a change to a threshold proportion of the code file, a change to a threshold number of lines of code of the code file, and creation of a new version of the code file.

19. The method of claim 18 wherein:
the change condition is creation of a new version of the code file;
the shadow code file comprises:
the content of each version of the code file; and
a link to each version of the code file.

* * * * *